US012679574B2

(12) United States Patent
Murphy et al.

(10) Patent No.: US 12,679,574 B2
(45) Date of Patent: Jul. 14, 2026

(54) HYBRID ELECTRIC DRIVE SYSTEMS FOR UNMANNED AIRCRAFT SYSTEMS

(71) Applicant: Dragoon Technology LLC, Oro Valley, AZ (US)

(72) Inventors: Carlos Murphy, Oro Valley, AZ (US); Jason Douglas, Oro Valley, AZ (US); Sean Culbertson, Oro Valley, AZ (US)

(73) Assignee: DRAGOON TECHNOLOGY LLC, Oro Valley, AZ (US)

( * ) Notice: Subject to any disclaimer, the term of this patent is extended or adjusted under 35 U.S.C. 154(b) by 496 days.

(21) Appl. No.: 17/953,148

(22) Filed: Sep. 26, 2022

(65) Prior Publication Data

US 2023/0146302 A1     May 11, 2023

Related U.S. Application Data

(60) Provisional application No. 63/277,102, filed on Nov. 8, 2021.

(51) Int. Cl.
| | |
|---|---|
| *B64D 27/02* | (2006.01) |
| *B64U 50/11* | (2023.01) |
| *B64U 50/19* | (2023.01) |
| *B64U 50/33* | (2023.01) |
| *B64U 50/34* | (2023.01) |

(52) U.S. Cl.
CPC ............. *B64U 50/11* (2023.01); *B64U 50/19* (2023.01); *B64U 50/33* (2023.01); *B64D 27/026* (2024.01); *B64U 50/34* (2023.01)

(58) Field of Classification Search
CPC ...... B64D 27/24; B64D 31/06; B64D 27/026; B64U 50/11; B64U 50/19; B64U 50/33; B64U 50/34

USPC .................................. 701/3, 54, 14, 99, 490
See application file for complete search history.

(56) References Cited

U.S. PATENT DOCUMENTS

| | | | |
|---|---|---|---|
| 4,123,481 | A | 10/1978 | Herold et al. |
| 5,315,819 | A | 5/1994 | Page et al. |
| 7,994,745 | B2 | 8/2011 | Fujino et al. |
| 8,008,801 | B2 | 8/2011 | Fujino et al. |
| 8,296,036 | B2 | 10/2012 | Matuszeski et al. |
| 9,120,560 | B1 | 9/2015 | Armer et al. |
| 9,493,245 | B2 | 11/2016 | Salyer |
| 9,751,625 | B2 | 9/2017 | Phan et al. |

(Continued)

FOREIGN PATENT DOCUMENTS

| | | | |
|---|---|---|---|
| JP | 6570095 | 9/2019 | |
| WO | WO-2019099804 A1 * | 5/2019 | ........... B23K 9/1006 |

OTHER PUBLICATIONS

Clark et al., "LEAPTech HEIST Power Architecture and Testing", 2015 AIAA Aviation Technology, Integration, and Operations Conference Dallas, TX (Jun. 25, 2015), https://pdfs.semanticscholar.org/ba45/3bcf7da57ec2be2712b909d4d60f101bafbf.pdf.

(Continued)

*Primary Examiner* — Jonathan L Sample
(74) *Attorney, Agent, or Firm* — SNELL & WILMER L.L.P.

(57) ABSTRACT

A hybrid powerplant can include a main power bus; an engine; a generator coupled to the engine, the generator in electrical communication with the main power bus; an energy storage; an electrical switch disposed electrically between the main power bus and the energy storage; and a controller in electrical communication with the electrical switch.

8 Claims, 18 Drawing Sheets

(56)　　　　References Cited

U.S. PATENT DOCUMENTS

| | | | |
|---|---|---|---|
| 9,751,626 | B2 | 9/2017 | Phan et al. |
| 9,764,837 | B2 | 9/2017 | Phan et al. |
| 9,902,495 | B2 | 2/2018 | Phan et al. |
| 10,017,266 | B2 | 7/2018 | Phan et al. |
| 10,035,596 | B2 | 7/2018 | Phan et al. |
| 10,065,726 | B1 | 9/2018 | Phan et al. |
| 10,198,011 | B2 | 2/2019 | DeBitetto et al. |
| 10,266,262 | B2 | 4/2019 | Phan et al. |
| 10,308,358 | B2 | 6/2019 | Phan et al. |
| 10,400,840 | B2 | 9/2019 | Davis et al. |
| 10,469,007 | B2 | 11/2019 | Nayfeh et al. |
| 10,501,195 | B2 | 12/2019 | Wang et al. |
| 10,571,932 | B2 | 2/2020 | DeBitetto et al. |
| 11,312,503 | B1 * | 4/2022 | Said ........................ B64D 41/00 |
| 2009/0156068 | A1 | 6/2009 | Barrett et al. |
| 2015/0046010 | A1 * | 2/2015 | Wakashiro ............ B60W 20/00 |
| | | | 180/65.265 |
| 2015/0329007 | A1 * | 11/2015 | Matsunaga ............. H02J 7/933 |
| | | | 320/126 |
| 2016/0107748 | A1 | 4/2016 | Luyks |
| 2016/0137304 | A1 * | 5/2016 | Phan ..................... B64C 27/001 |
| | | | 244/17.23 |
| 2016/0167799 | A1 * | 6/2016 | Smaoui ..................... F02C 6/14 |
| | | | 701/16 |
| 2016/0322922 | A1 * | 11/2016 | Yu .............................. H02P 9/04 |
| 2017/0008627 | A1 * | 1/2017 | de Soto .................. G07C 5/008 |
| 2017/0066531 | A1 * | 3/2017 | McAdoo .................. B64C 27/26 |
| 2018/0194484 | A1 * | 7/2018 | Livieratos .............. B64U 50/11 |
| 2018/0354631 | A1 * | 12/2018 | Adibhatla .............. B64D 27/35 |
| 2020/0062413 | A1 * | 2/2020 | Feddersen ............... B60L 50/62 |
| 2020/0063599 | A1 * | 2/2020 | Waun ...................... B60L 50/16 |
| 2021/0179067 | A1 * | 6/2021 | Choi ................ F02M 35/10242 |
| 2022/0017064 | A1 * | 1/2022 | Dougherty .............. H02J 1/106 |
| 2022/0073052 | A1 * | 3/2022 | Zhou ...................... B64U 20/40 |
| 2022/0185490 | A1 * | 6/2022 | Ricci ....................... H02P 21/24 |
| 2024/0337213 | A1 * | 10/2024 | Spitzer ..................... F02C 6/12 |

OTHER PUBLICATIONS

Costello, L. A., "State of the Art of Piloted Electric Airplanes, NASA's Centennial Challenge Data and Fundamental Design Implications"; Embry-Riddle Aeronautical University (Fall 2011); Dissertations and Theses, https://commons.erau.edu/cgi/viewcontent. cgi?article=1036&context=edt.

Castillo et al., "Modelling and Control of Mini-Flying Machines" (2005), https://ui.adsabs.harvard.edu/abs/2005mcmf.book.....C/ abstract.

Seimens, Diamond Aircraft and EADS, "World's first serial hybrid electric aircraft to fly at Le Bourget"; Press Release (Jun. 20, 2011).https://press.siemens.com/global/en/pressrelease/worlds-first-serial-hybrid-electric-aircraft-fly-le-bourget.

"Hybrid electric aircraft" Wikipedia, Wikipedia Foundation, Inc., May 27, 2022, https://en.wikipedia.org/wiki/Hybrid_electric_aircraft#2011.

"Hybrid vehicle drivetrain" Wikipedia, Wikipedia Foundation, Inc., Jul. 12, 2022, https://en.wikipedia.org/wiki/Hybrid_vehicle_drivetrain.

YouTubeVideo, Sangsriri, S., "86.06 minutes flight time for 60 CC Gas engine Hybrid multirotor." (Dec. 5, 2014) Citation No. GE HM 01, https://www.youtube.com/watch?v=4r-6214CoGA.

Newcome. L, "Unmannded Aviation: A Brief History of Unmanned Aerial Vehicles", Aug. 22, 2012, https://doi.org/10.2514/4.868894.

"DIYDRONES The Leading Community for Personal UAVs" (Nov. 29, 2010) Shrader, D., https://diydrones.com/forum/topics/gas-hybrid-quad-rotor-uav.

Rank, J. Dr., "Great Horned Owl Program (GHO) Phase 1 Contracts: Proof of Concept Demonstrations of Very Quiet Hybrid Electric Power Generation Subsystems and Electrically Driven Propulsors for UAV Applications", IARPA Day Poster, https://www. iarpa.gov/images/PropsersDayPDFs/GHO/04-GHO_final_v2pdf-iarpa_day.pdf.

* cited by examiner

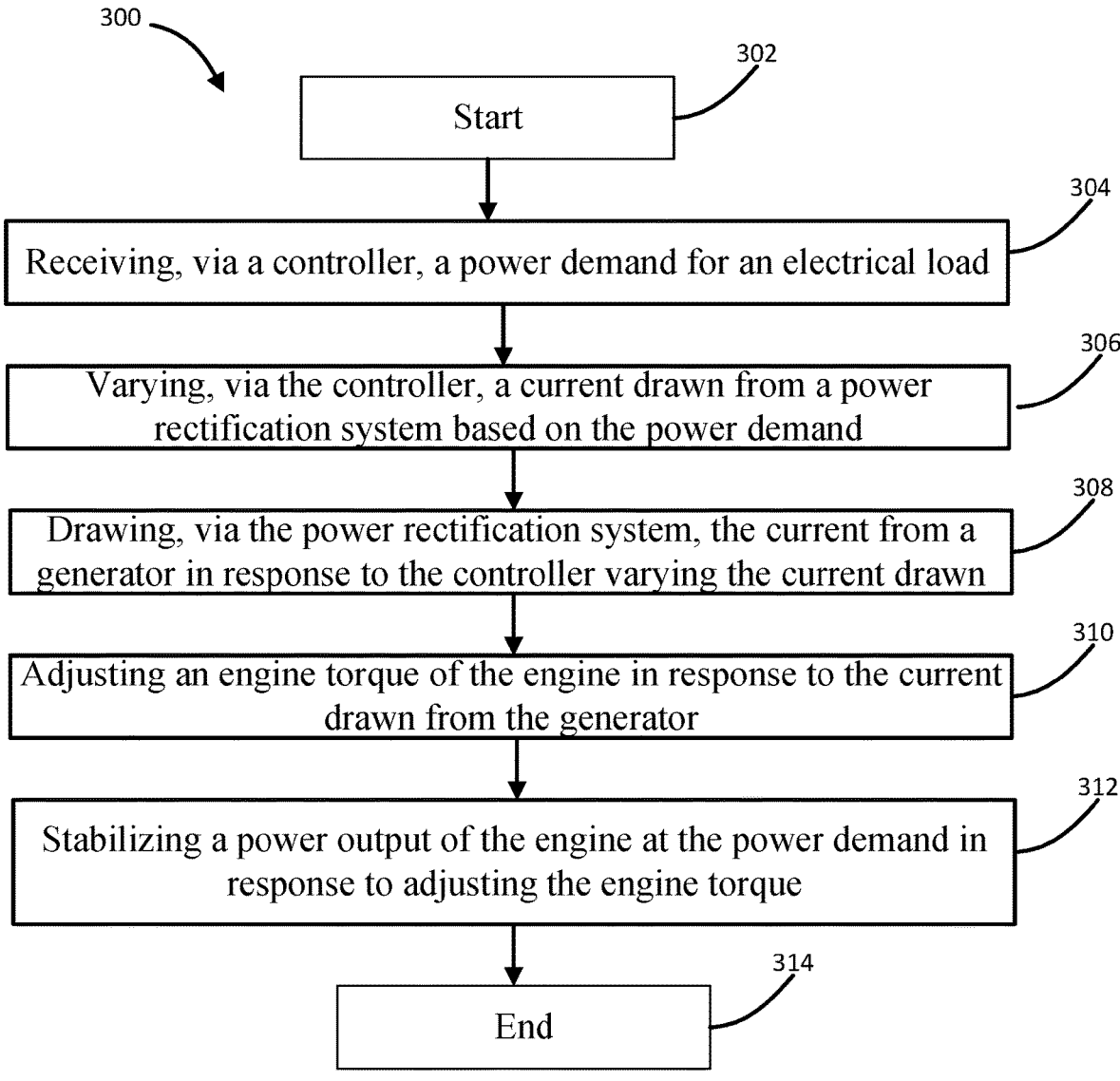

300

302

Start

304

Receiving, via a controller, a power demand for an electrical load

306

Varying, via the controller, a current drawn from a power rectification system based on the power demand

308

Drawing, via the power rectification system, the current from a generator in response to the controller varying the current drawn

310

Adjusting an engine torque of the engine in response to the current drawn from the generator

312

Stabilizing a power output of the engine at the power demand in response to adjusting the engine torque

314

End

FIG. 4A

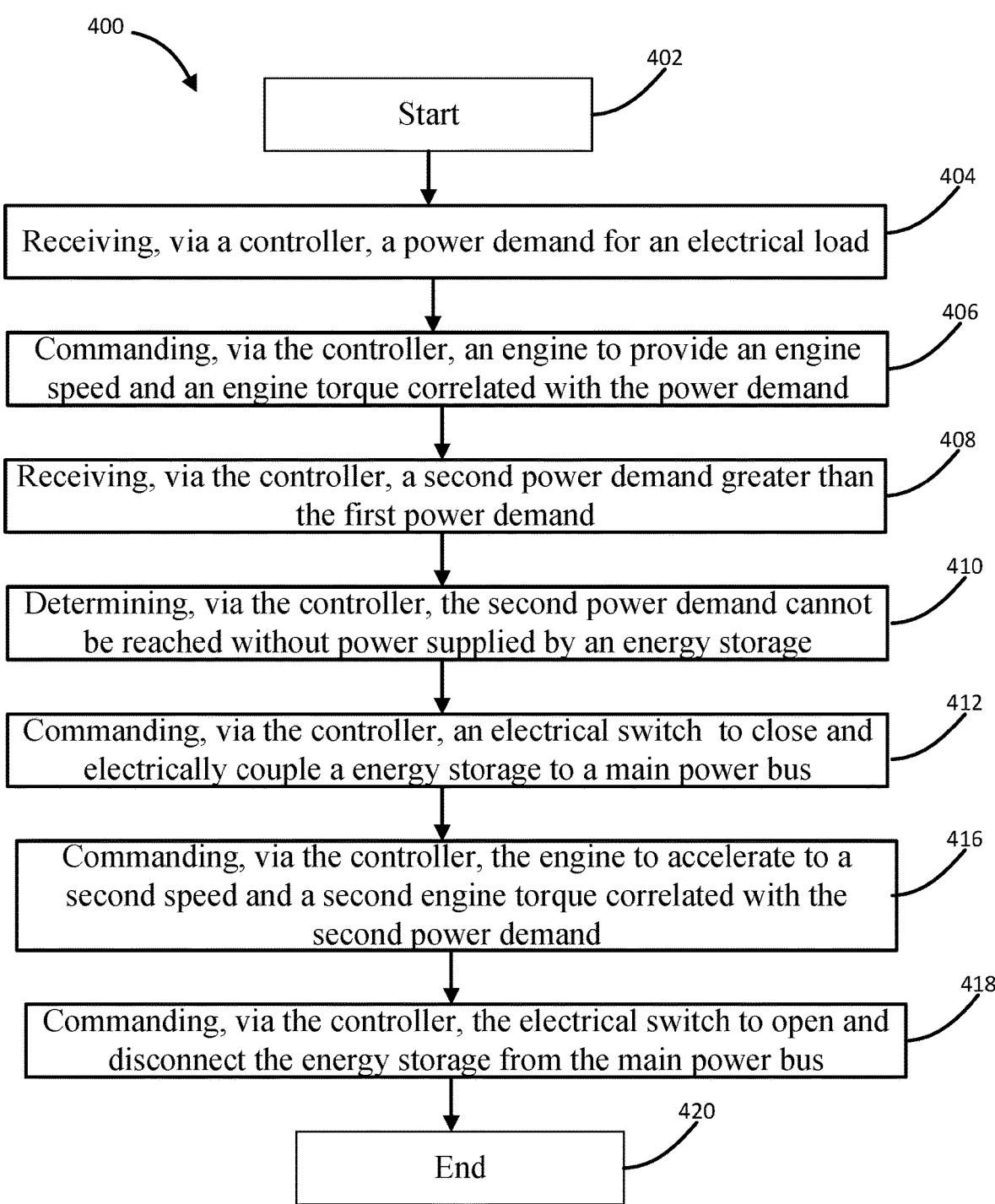

400

402
Start

404
Receiving, via a controller, a power demand for an electrical load

406
Commanding, via the controller, an engine to provide an engine speed and an engine torque correlated with the power demand 408
Receiving, via the controller, a second power demand greater than the first power demand 410
Determining, via the controller, the second power demand cannot be reached without power supplied by an energy storage 412
Commanding, via the controller, an electrical switch to close and electrically couple a energy storage to a main power bus 416
Commanding, via the controller, the engine to accelerate to a second speed and a second engine torque correlated with the second power demand 418
Commanding, via the controller, the electrical switch to open and disconnect the energy storage from the main power bus 420
End

FIG. 4B

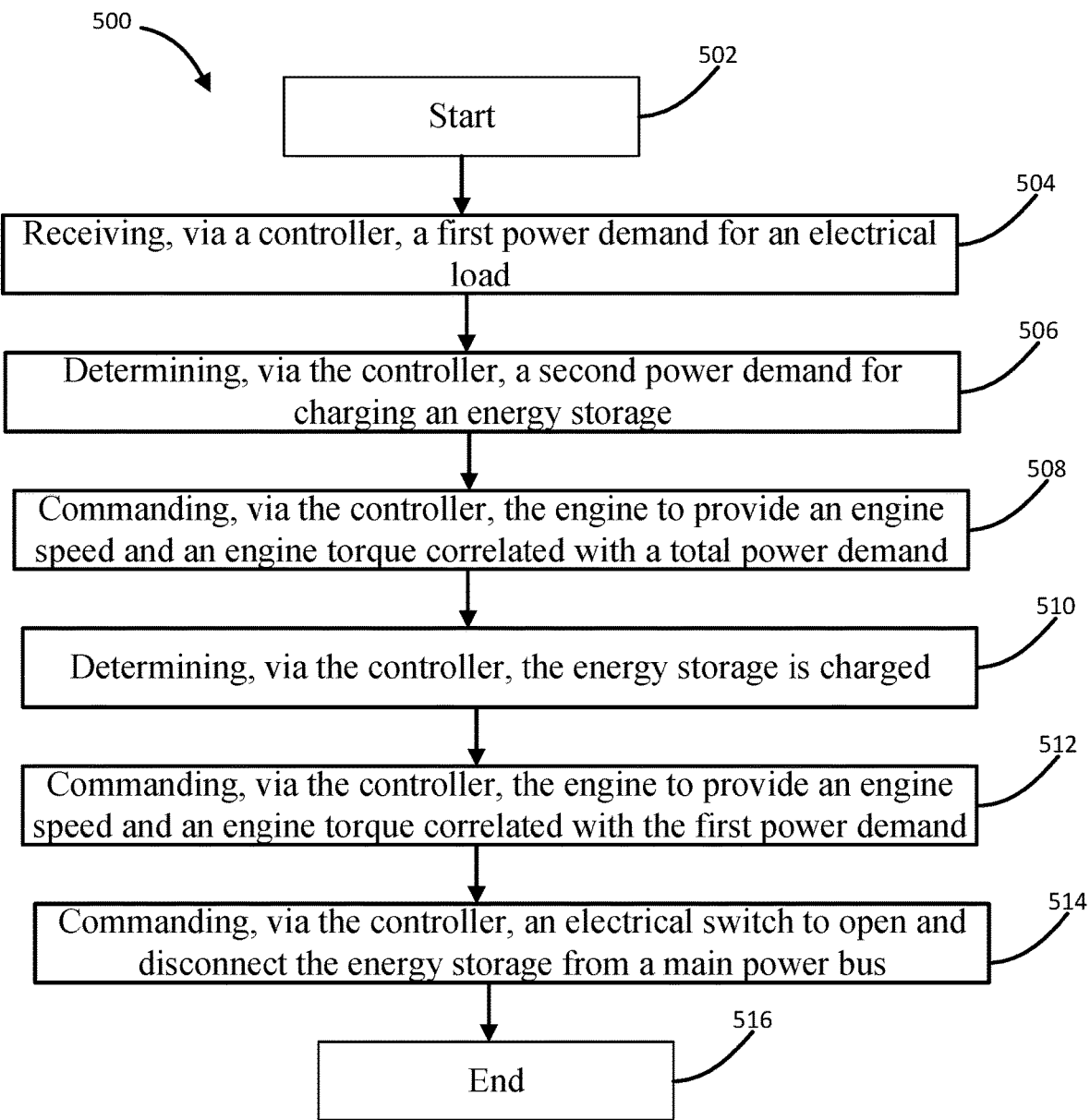

500

502
Start

504
Receiving, via a controller, a first power demand for an electrical load

506
Determining, via the controller, a second power demand for charging an energy storage 508
Commanding, via the controller, the engine to provide an engine speed and an engine torque correlated with a total power demand 510
Determining, via the controller, the energy storage is charged 512
Commanding, via the controller, the engine to provide an engine speed and an engine torque correlated with the first power demand 514
Commanding, via the controller, an electrical switch to open and disconnect the energy storage from a main power bus 516
End

FIG. 5

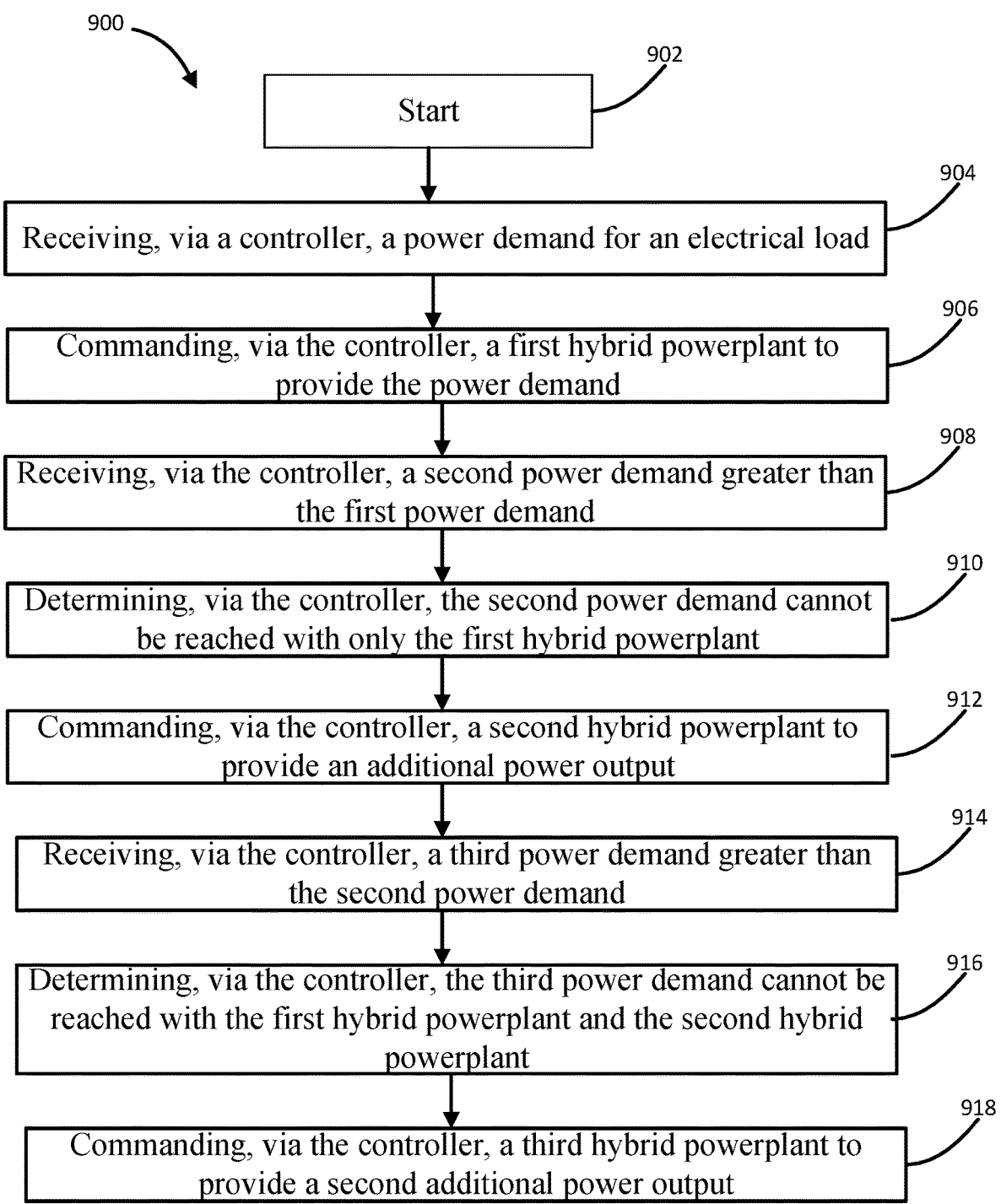

900

902

Start

904

Receiving, via a controller, a power demand for an electrical load

906

Commanding, via the controller, a first hybrid powerplant to provide the power demand

908

Receiving, via the controller, a second power demand greater than the first power demand

910

Determining, via the controller, the second power demand cannot be reached with only the first hybrid powerplant

912

Commanding, via the controller, a second hybrid powerplant to provide an additional power output

914

Receiving, via the controller, a third power demand greater than the second power demand

916

Determining, via the controller, the third power demand cannot be reached with the first hybrid powerplant and the second hybrid powerplant

918

Commanding, via the controller, a third hybrid powerplant to provide a second additional power output

FIG. 10

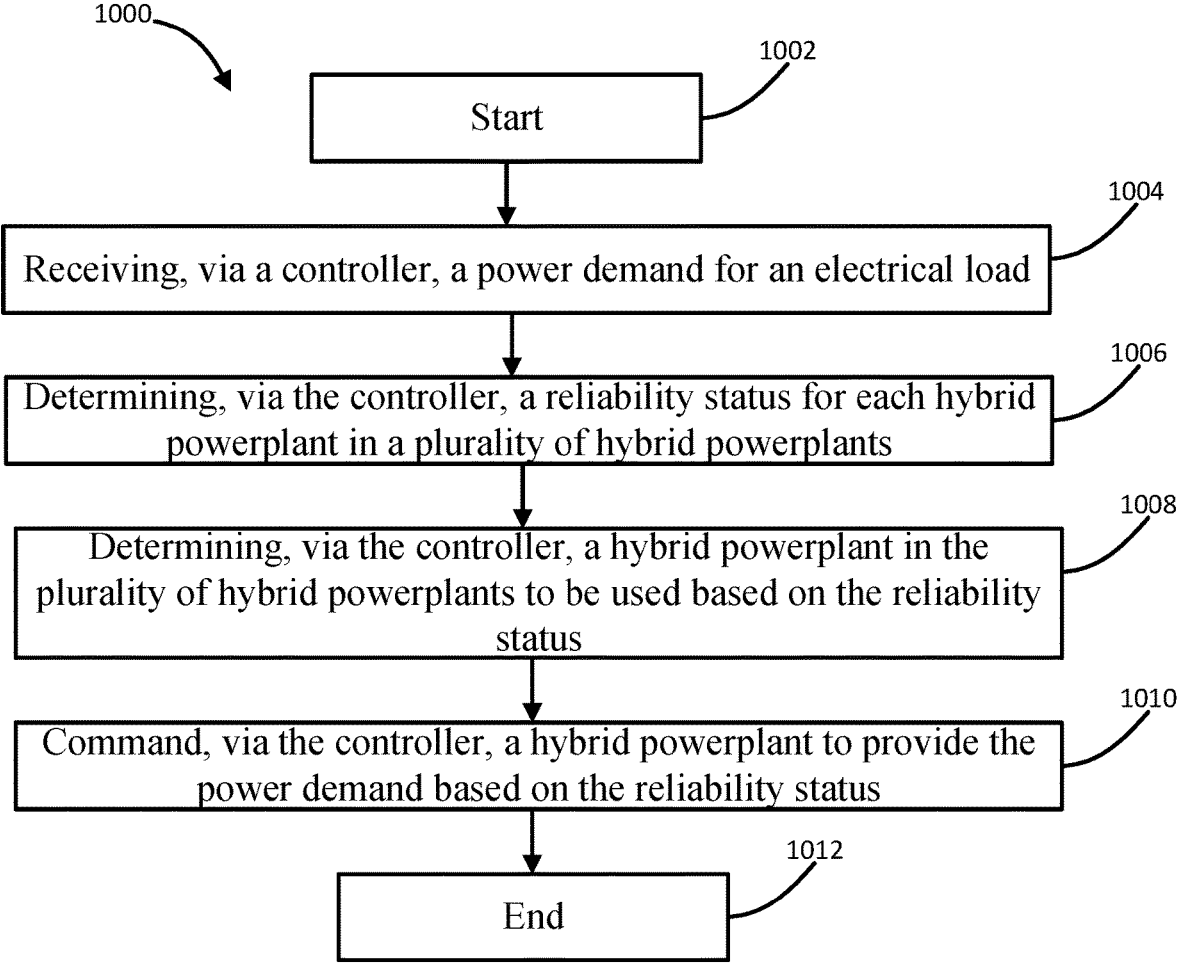

1000

1002
Start

1004
Receiving, via a controller, a power demand for an electrical load

1006
Determining, via the controller, a reliability status for each hybrid powerplant in a plurality of hybrid powerplants 1008
Determining, via the controller, a hybrid powerplant in the plurality of hybrid powerplants to be used based on the reliability status 1010
Command, via the controller, a hybrid powerplant to provide the power demand based on the reliability status 1012
End

Monitoring, via a controller, a period of time between operation for each hybrid powerplant in a plurality of hybrid powerplants

1306

Determining, via the controller, a hybrid powerplant has not been operated for a first period of time

1308

Commanding, via the controller, the hybrid powerplant to operate for a second period of time

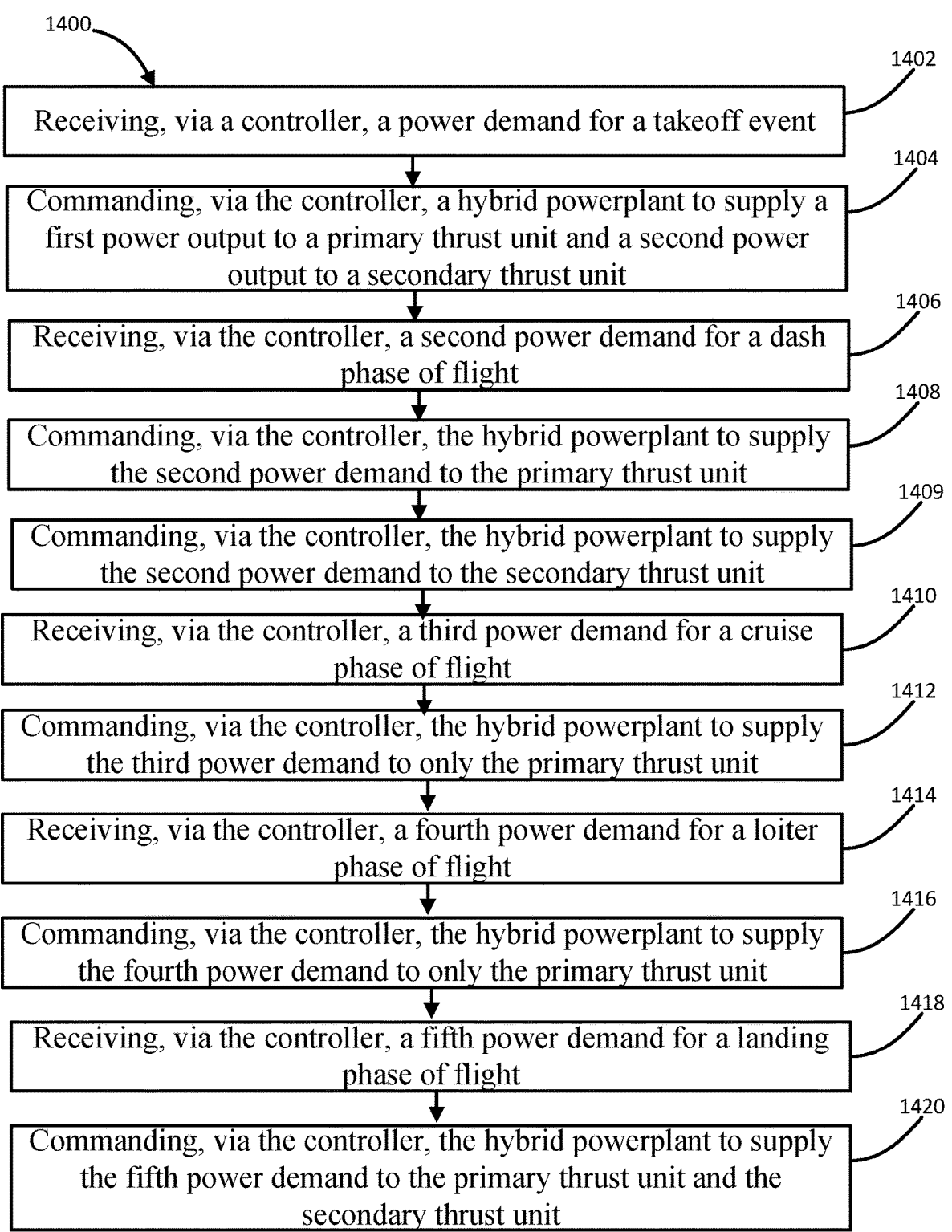

1400

1402
Receiving, via a controller, a power demand for a takeoff event

1404
Commanding, via the controller, a hybrid powerplant to supply a first power output to a primary thrust unit and a second power output to a secondary thrust unit 1406
Receiving, via the controller, a second power demand for a dash phase of flight 1408
Commanding, via the controller, the hybrid powerplant to supply the second power demand to the primary thrust unit 1409
Commanding, via the controller, the hybrid powerplant to supply the second power demand to the secondary thrust unit 1410
Receiving, via the controller, a third power demand for a cruise phase of flight 1412
Commanding, via the controller, the hybrid powerplant to supply the third power demand to only the primary thrust unit 1414
Receiving, via the controller, a fourth power demand for a loiter phase of flight 1416
Commanding, via the controller, the hybrid powerplant to supply the fourth power demand to only the primary thrust unit 1418
Receiving, via the controller, a fifth power demand for a landing phase of flight 1420
Commanding, via the controller, the hybrid powerplant to supply the fifth power demand to the primary thrust unit and the secondary thrust unit

FIG. 15

HYBRID ELECTRIC DRIVE SYSTEMS FOR UNMANNED AIRCRAFT SYSTEMS

CROSS-REFERENCE TO RELATED APPLICATIONS

This application is a non-provisional of, and claims priority to, and the benefit of U.S. Provisional Application No. 63/277,102, entitled "HYBRID ELECTRIC DRIVE SYSTEMS FOR UNMANNED AIRCRAFT SYSTEMS," filed on Nov. 8, 2021, which is hereby incorporated by reference in its entirety. The disclosure of the foregoing applications are incorporated herein by reference in their entirety, including but not limited to those portions that specifically appear hereinafter, but except for any subject matter disclaimers or disavowals, and except to the extent that the incorporated material is inconsistent with the express disclosure herein, in which case the language in this disclosure shall control.

FIELD

The present disclosure relates generally to hybrid electric drive systems for unmanned aircraft systems (UAS).

BACKGROUND

Modern hybrid drive systems for powering vehicles typically employ fixed voltage buses controlled by either generator speed, the use of an alternator, or by electronic conversion hardware. Additionally, electric loads for such systems are designed to consume power within a narrow range of voltage due to these constraints. Modern hybrid drive systems typically either employ conversion electronics, which may be heavy and expensive, or provide a fixed generator speed to meet a desired output voltage, which tends to reduce efficiency when operating off the optimal design point.

SUMMARY

A hybrid powerplant is disclosed herein. In various embodiments, the hybrid power plant comprises: a main power bus; an engine; a generator coupled to the engine, the generator in electrical communication with the main power bus; an energy storage; an electrical switch disposed electrically between the main power bus and the energy storage; and a controller in electrical communication with the electrical switch.

In various embodiments, the controller is configured to close the electrical switch to electrically couple the energy storage to the main power bus. The controller can be configured to command the electrical switch to close in response to determining a power demand of an electrical load is greater than a maximum power output for the generator.

In various embodiments, the hybrid powerplant is configured to provide a variable voltage output to an electrical load through the main power bus.

In various embodiments, the controller is configured to: receive a power demand for an electrical load that is greater than a current power demand; command the electrical switch to transition from an open position to a closed position to electrically couple the energy storage to the main power bus; and command the electrical switch to close in order to facilitate the energy storage to provide additional current capacity.

In various embodiments, the controller is further configured to: command the engine to accelerate to a second speed and a second engine torque correlated with the power demand; and command the electrical switch to transition from the closed position to the open position to disconnect the energy storage from the main power bus. In various embodiments, the controller is further configured to determine when the engine is operating at the second speed and the second engine torque prior to commanding the electrical switch to transition from the closed position to the open position.

An electric vehicle is disclosed herein. In various embodiments, the electric vehicle comprises: an electrically powered load; a main power bus in electrical communication with the electrically powered load; and a hybrid powerplant, comprising: a power bus in electrical communication with the main power bus; an engine; a generator coupled to the engine, the generator in electrical communication with the power bus; an energy storage configured to be electrically isolated from the power bus in a first state and to be electrically coupled to the power bus in a second state, the hybrid powerplant configured to provide a varying voltage output based on a power demand from the electrically powered load.

In various embodiments, the electric air vehicle is an unmanned air vehicle (UAV).

In various embodiments, the hybrid powerplant is configured to power the electrically powered load in the first state via the generator only and in the second state via the generator and the energy storage. The generator can power the electrically powered load and charge the energy storage.

In various embodiments, the electric air vehicle further comprises an electrical switch disposed between the energy storage and the power bus. The electric air vehicle can further comprise a controller in electrical communication with the electrical switch, the controller configured to transition the electrical switch from the first state to the second state in response to receiving a second power demand that exceeds a maximum generator power output. The electric air vehicle can further comprise a controller in electrical communication with the electrical switch, the controller configured to: receive a second power demand for the electrically powered load that is greater than a current power demand; command the electrical switch to transition from the first state to the second state to electrically couple the energy storage to the main power bus; and command the energy storage to provide additional current capacity.

In various embodiments, the electrically powered load comprises a load motor controller and a load motor, the load motor controller in electrical communication with a power rectification system, the power rectification system in electrical communication with the generator. In various embodiments, the load motor controller is configured to vary a duty cycle from a first duty cycle to a second duty cycle, and in response to transitioning to the second duty cycle, the engine is stabilized in a new state of operation.

A generator management unit for a hybrid powerplant is disclosed herein. In various embodiments, the generator management unit comprises: a processor; and a tangible, non-transitory computer-readable storage medium having instructions stored thereon that, in response to execution by the processor, cause the processor to perform operations comprising: receiving, via the processor, a power demand for an electrical load that is greater than a current power demand being provided to the electrical load, the current power demand being provided by a generator operably coupled to an engine, the generator providing a first voltage;

commanding, via the processor, an electrical switch to transition from an open position to a closed position to electrically couple an energy storage to a main power bus, the main power bus in electrical communication with the electrical load; and in response to the energy storage becoming electrically coupled to the main power bus, achieving the power demand.

In various embodiments, the engine operates at a first speed and a first engine torque to produce the current power demand, and wherein the operations further comprise: commanding, via the processor, the engine to accelerate to a second speed and a second engine torque correlated with the power demand; and commanding, via the processor, the electrical switch to transition from the closed position to the open position in response to the engine operating at the second speed and the second engine torque.

In various embodiments, the power demand exceeds a generator maximum power output of the generator.

In various embodiments, the operations further comprise: determining, via the processor, a second power demand for charging the energy storage; commanding, via the processor, the engine to provide a second engine speed and a second engine torque correlated with a total power demand, the generator configured to power the electrical load and charge the energy storage in response to the engine providing the second engine speed and the second engine torque; and commanding the electrical switch to transition from the closed position to the open position in response to determining the energy storage is charged.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 4A illustrates a process for operating a system of FIGS. 3A and 3B, in accordance with various embodiments.

FIG. 4B illustrates a process for operating a system of FIG. 3A, in accordance with various embodiments.

FIG. 5 illustrates a process for operating a system of FIG. 3A, in accordance with various embodiments.

FIG. 10 illustrates a process for operating a system of FIG. 9, in accordance with various embodiments.

FIG. 11 illustrates a process for operating a system of FIG. 9, in accordance with various embodiments.

FIG. 15 illustrates a process for operating a system of FIG. 3A or FIG. 9, in accordance with various embodiments.

DETAILED DESCRIPTION

Figure 1A:
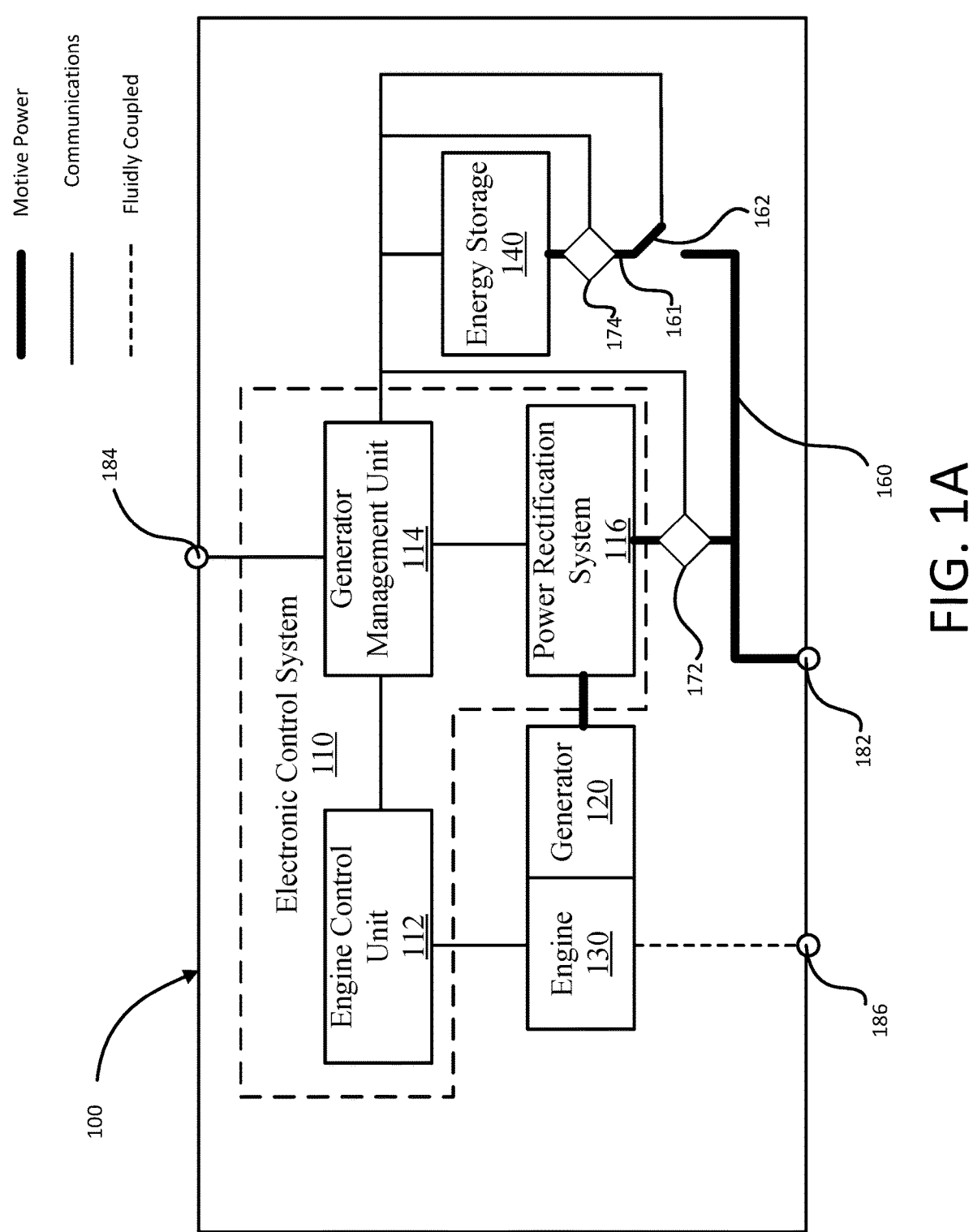
FIG. 1A illustrates a schematic view of hybrid powerplant, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Hybrid Powerplant for UAV Systems

Unmanned air vehicle ("UAV") systems may comprise a generator configured to create an alternating voltage and current (e.g., single phase or three-phase) having a frequency and a voltage that are proportional to a speed of rotation of an engine for the UAV. The power delivered by the UAV system may be modulated by changing the voltage (which is roughly proportional to rotational speed) or current (which is roughly proportional to torque). The electrical loads of the UAV systems, and their associated mechanical components (i.e., propellers, fans, etc.), are typically designed to consume power within a narrow range of voltage due to the above constraints. Thus, UAV systems may typically have a voltage output from a generator that is near constant (i.e., a voltage output that varies less than plus or minus five volts from an average voltage output). Additionally, the above constraints further require either that the generator run at a constant speed or that there are power electronics that can convert the output voltage of the generator to an appropriate voltage for a main power bus.

Controlling a generator to run at constant speeds tends to prevent the engine from achieving a maximum efficiency, especially when a system includes a widely variable output power, such as UAV systems disclosed herein. Converting from a voltage output of a generator to a bus voltage may result in heavy and expensive power conversion electronics, which are undesirable, especially for more light weight UAV applications (i.e., UAV systems with a maximum gross takeoff weight less than or equal to 50 pounds (23 kg)), where a slight increase in aircraft weight can have a much greater impact on efficiency relative to larger systems.

Furthermore, in hybrid UAV systems where an energy storage (e.g., a battery, a super capacitor, etc.) is used either for backup or surge power, a voltage output of the energy storage must remain in a narrow band, thus requiring conversion electronics, which may be heavy, if the energy storage is to power a load at a different voltage relative to the generator output voltage, or receive charging power from a different voltage.

Alternators could be utilized in some embodiments to create a fixed voltage from a varying shaft speed but would be inefficient due to the amount of stator current associated with using the alternator and may be limited to low-power accessory type applications.

Disclosed herein is a hybrid powerplant for UAV systems, in accordance with various embodiments. Although discussed with respect to UAV systems, the present disclosure is not limited in this regard. For example, one skilled in the art may recognize various applications of the hybrid powerplant disclosed herein, such as for other gas, electric, hydrogen powered vehicles, or any combination of gas, electric, and hydrogen powered vehicles (e.g., cars, trucks, boats, etc.).

In various embodiments, the hybrid powerplant comprises an electronics control system, an engine, a generator, an energy storage, and a main power bus. The engine control system may comprise various modules, such as an engine control unit, a power rectification system (e.g., an electronic speed control, an active rectifier, or the like), and/or a generator management unit. In various embodiments, the engine may comprise an internal combustion engine ("ICE") (e.g., a two-stroke or four-stroke engine). The present disclosure is not limited with respect to any specific fuel type. For example, any fluid fuel, such as hydrogen, propone, diesel, etc. is within the scope of this disclosure. Similarly, any thermodynamic cycle (e.g., Brayton, Atkinson, diesel, etc.) is within the scope of this disclosure. In various embodiments, the generator is configured to operate at varying speeds. In this regard, the generator of the hybrid powerplant may be configured to operate more efficiently relative to typical UAV systems by being modulated to provide a combination of speed and torque based on predetermined parameters, such as efficiency, decibel level, or the like.

In various embodiments, the main power bus is configured to carry a motive power from the generator to an electrical load and associated mechanical components (i.e., propellers, fans, etc.). In various embodiments, the energy storage is configured to connect and disconnect from the main power bus as described further herein. Although described herein as utilizing a battery, the present disclosure is not limited in this regard. For example, other electrical energy storage devices, such as a super capacitor may be utilized, in accordance with various embodiments.

In various embodiments, the hybrid powerplant may further comprise a charging system. In this regard, the charging system may be configured to re-charge the battery when the battery is not in use.

In various embodiments, the hybrid powerplant disclosed herein is configured to feed an electrical load (e.g., a propellor, a ducted fan, a rotor, wheels, tracks, etc.) and is configured to vary a voltage level supplied to the load across a wide range to achieve the motive goals of the hybrid powerplant. For example, the hybrid powerplant may be configured to vary a voltage level between 10 and 70 volts, or between 15 and 60 volts.

In various embodiments, the hybrid powerplant disclosed herein may have various modes of operation. For example, the hybrid powerplant may include an excess power mode, a standard power mode, and a starting mode. In the "excess power mode," the energy storage is in electrical communication with the main power bus, whereas in the "standard power mode," the battery is electrically disconnected from the main power bus. In the "starting mode," the battery is connected to the main power bus and configured to power the generator, which is configured as a motor to cause the engine to rotate, thus starting the engine. In various embodiments, the "standard power mode" may further be configured to provide a slight charge (e.g., between 0.5C and 2C, or approximately 1C) to the battery in response to excess power being available from the generator.

In various embodiments, the hybrid powerplant disclosed herein may facilitate greater power efficiency and fuel efficiency relative to typical powerplants for UAV systems. In various embodiments, the hybrid powerplant disclosed herein may further facilitate a high endurance UAV system capable of continuously operating for long periods of time (e.g., 20 hours or greater), as described further herein. In various embodiments, by allowing an output voltage of the generator to vary below an output voltage of the battery, voltage conversion electronics may be eliminated, resulting in a reduction in weight relative to typical systems. In this regard, the hybrid powerplant may result in reduction in system complexity (i.e., no conversion hardware), increase in system efficiency (i.e., little to no conversion loss), and an increase in reliability relative to typical systems, in accordance with various embodiments.

Hybrid Powerplant for UAV Systems

In a hybrid drive system, the power output by the load can be modulated in various ways. One way is to throttle an internal combustion engine (ICE) portion of the system, then allow the increased or reduced engine power to flow through to the load. Another method commonly used is to provide an energy buffer between the generator and the load, such as a battery or capacitor, and control each device (the generator and the load) independently to provide both the desired load output and the desired rate of change of buffer energy (i.e., to allow the battery to discharge, to charge the battery, or to hold it steady). Without an energy buffer, which can be costly and add weight, the second method is less feasible. In implementing the first method, it can be shown that reducing the engine (e.g., an ICE) power output by throttling its intake results in the engine running in a state that tends to be less efficient, since throttling the engine means reducing its mass airflow, which reduces its compression ratio, which reduces its thermodynamic efficiency.

Disclosed herein is a hybrid powerplant and drive system for a UAV that can comprise a fuel-burning reciprocating ICE, a generator coupled to shaft of said engine, a power rectification system (active rectifier or an Electronic Speed Control (ESC) motor controller acting in a generator mode), a variable voltage power bus, a disconnect-able energy storage device (e.g., a battery, or the like), a motor controller, and a load motor.

The disconnect-able power source can be used for starting the ICE, for power boost (as described herein), and for backup power (as described herein, but can be configured to remain disconnected during normal operation.

During the primary operating mode of the hybrid power-plant disclosed herein, with the energy storage disconnected, a system command can be provided, in which a higher value demands a higher power output from the system. This command can be interpreted to mean a particular speed (e.g., measured in revolutions per minute, or RPMs) and throttle setting (measured between 0% and 100%) of the engine. To achieve this engine state, the load motor can be commanded to control the speed of the engine, by varying its current draw, thereby varying the load on the engine and then the speed of the engine.

In general, a desired throttle setting will be 'full throttle' (i.e., a throttle valve that is 100% open), as that typically will allow the engine to run with the highest compression ratio and therefore the highest thermodynamic efficiency. If the ICE is a two-stroke engine, there may be some advantage to operating at lower than full throttle, because two-stroke engines have a certain amount of 'short circuit' air charge that flows through the cylinder and out the exhaust, never being burned in the combustion stroke. Because of this, two stroke engines may have lower thermodynamic efficiency at somewhat 'closed' throttle settings but have a higher overall efficiency if the 'short circuited' fuel is less than at full throttle. Stated another way, in various embodiments, the engine disclosed herein may include a desired throttle set-ting that is less than full throttle and the method associated with this operation mode can still apply. Port injection can be used to help prevent fuel from short circuiting by inject-ing fuel into the air mass which has a higher proportion retained in the engine, typically later in the intake stroke.

In various embodiments, by operating a hybrid power-plant as disclosed herein, the engine can be operated at a desired speed and throttle setting (typically 100% open throttle valve). By operating at wide open throttle across a range of power outputs, the efficiency of the engine is increased since it is operating at the highest effective com-pression ratio possible for any commanded load requirement and fuel consumption is less for a given power output, in accordance with various embodiments.

UAV Systems with Multiple Hybrid Powerplants

Typical internal combustion powerplants in small UAV system applications (i.e., with maximum gross takeoff weight between 25 pounds (11 kg) and 200 pounds (91 kg)) are unreliable relative to internal combustion powerplants in other industries. UAV applications are significantly more dependent on powerplant reliability relative to other indus-tries, as malfunction of the powerplant my result in loss of an aircraft and potential risk to people or property on the ground.

UAV systems utilize a wide range of power during operation. For example, on launch and landing, up to three or more times an amount of power may be utilized compared to during cruise or loitering speed. In some cases, such as vertical takeoff and landing aircraft, UAV systems may utilize between five to ten times the power to launch relative to cruise.

In some cases, mission profiles may further exacerbate power differences during various phases of flight. For example, in some cases a mission profile may include a launch and dash phase, where high power is utilized, fol-lowed by a long loiter, where significantly lower power is utilized.

Internal combustion engines utilized in small UAV sys-tems may have a range of operation (e.g., between 40% and 80% of maximum power output) where they provide rea-sonable fuel efficiency. However, at higher and lower power outputs for many two stroke engines, fuel consumption per energy output is far lower than that in the middle power output (e.g., during cruise). In this regard, internal combus-tion engines may be designed to be efficient in cruise flight as the UAV system spends a majority of time in a cruise flight operating condition. Thus, efficiency may be sacrificed in short duration launch, dash portions, loiter portions, landing portions, or the like to achieve high power outputs or low power outputs.

Internal combustion engines may be most efficient when designed and configured to run at a relatively high power per displacement. For example, internal combustion engines configured in this manner achieve higher thermal efficiency through higher effective compression ratios.

Disclosed herein is a UAV system with a plurality of hybrid powerplants. In this regard, a main controller may be in electrical communication with a plurality of hybrid pow-erplants, each hybrid powerplant configured to at least partially power an electrical load and its associated mechani-cal components (i.e., propellers, fans, etc.). In various embodiments, a subset of hybrid powerplants in the plurality of hybrid powerplants are configured to power the electrical load, where a first hybrid powerplant in the plurality of hybrid powerplants may remain off during typical operation and may be powered on in response to a second powerplant in the plurality of hybrid powerplants becoming inoperable during flight, excess power being desired, or the like. The hybrid powerplant system may be optimized for running at high power outputs via the subset of hybrid powerplants in the plurality of hybrid powerplants, or via all hybrid pow-erplants in the plurality of hybrid powerplants.

In various embodiments, the UAV system may provide greater reliability relative to typical systems. The UAV system may be configured such that a first hybrid powerplant in the plurality of powerplants always provides power to the electrical load. In this regard, in some flight conditions (e.g., cruise and/or loiter), the first hybrid powerplant may be the sole source of power to the electrical load. In other flight conditions (e.g., launch, dash, landing), the first hybrid powerplant, a second hybrid powerplant, and/or a third hybrid powerplant in the plurality of hybrid powerplants may provide a combined power to the electrical load to meet power demands of the phase of flight. The UAV system may be configured with any additional hybrid powerplants in the manner mentioned above.

In various embodiments, during a life of the first hybrid powerplant, a cycle time of the first hybrid powerplant may be higher than a cycle time of the second hybrid powerplant, which may be higher than the third hybrid powerplant, etc. Thus, reliability may be significantly improved as a young-est (or unused) hybrid powerplant may take over in response to an oldest hybrid powerplant becoming inoperable during a flight.

In various embodiments, the UAV system disclosed herein may be configured to operate a selected hybrid powerplant in the plurality of hybrid powerplants in response to determining a most reliable hybrid powerplant in the plurality of hybrid powerplants. In this regard, each hybrid powerplant in the plurality of hybrid powerplants may be monitored based on a predicted product reliability over cycle time as described further herein.

In various embodiments, the UAV system may include additional modes of operation. For example, during preflight, launch, and/or recovery, all hybrid powerplants in the plurality of powerplants may be operated to ensure that maximum power is available for critical flight segments. Additionally, periodic running of the hybrid powerplant(s) being used the least may be performed to boil off water condensation and/or to distribute lubricating and protecting oils throughout the powerplant. Thus, corrosion may be prevented by periodic running of the hybrid powerplant(s), in accordance with various embodiments. In some embodiments, the periodic running of the powerplant may occur while the powerplant is in long term storage.

In various embodiments, each hybrid powerplant in the plurality of hybrid powerplants of the UAV system disclosed herein may be modular. In this regard, each hybrid powerplant may be replaceable with relative simplicity with minimum attachments to the UAV system. Additionally, since the power conducting interfaces of hybrid powerplants include only electrical interfaces with a respective UAV, the hybrid powerplants may further facilitate modularity as mechanical linkages will not have to be coupled to a respective propulsion system for a UAV, in accordance with various embodiments.

Internal combustion powerplants used in small UAV applications (e.g., below 500 pounds (227 kg) for maximum takeoff weight) typically have short service intervals (e.g., 200 hours or 300 hours), relative to gas turbine aircraft engine which may have servicing intervals around 3,000 to 6,000 hours. The low interval may be partially due to the single point of failure represented by the internal combustion powerplant of typical internal combustion only powerplant application. By using a plurality of hybrid powerplants as disclosed herein, and operating them as described herein, the hybrid powerplants may be replaced based on condition as opposed to being replaced on schedule. In this regard, the servicing interval for UAV systems disclosed herein may be significantly increased relative to typical UAV systems, in accordance with various embodiments. Additionally, the UAV systems disclosed herein increase the life of the UAV system, the life of the powerplants in the UAV system, and reduce an operating cost of the UAV system, in accordance with various embodiments.

UAV Systems with Primary and Secondary Thrust Units

Small UAV powerplants may provide a large range of thrust or power outputs, which are dependent on a phase of flight as described previously herein. Thus, it may be difficult for a single powerplant with a fixed pitch propeller to efficiently provide the thrust utilized at all stages of flight.

Engine driven propellors operate within a range of speeds allowed by the respective engine or utilize a gearbox to change the output speed. In this regard, typical UAV powerplants may have inefficiencies in response to utilizing a single engine or multiple engines that are continuously active.

Disclosed herein is a UAV system comprising a primary thrust unit and a secondary thrust unit. In various embodiments, the hybrid powerplants disclosed herein may facilitate utilizing an additional secondary thrust unit. In this regard, the secondary thrust unit may be in an off state during cruise and/or loiter (i.e., low power states of operation) and may be utilized during a launch or climb state (i.e., higher power states of operation), in accordance with various embodiments. In this regard, climb and launch phases of flight may be more efficient and achieve higher performance.

In various embodiments, the secondary thrust unit may be sized and configured for a specific state, or specific states, of flight. For example, the secondary thrust unit may be sized and configured for auxiliary power during launch, dash, landing, or the like. In contrast, the primary thrust unit may be sized and configured for states of flight that are independent of the secondary thrust unit (e.g., cruise, loiter or the like). In various embodiments, by sizing the primary thrust unit for cruise alone, the primary thrust unit may be optimized for efficiency during cruise and the propulsion system may provide additional power, and consequently maintain efficiency, during launch, dash, landing, etc. by supplementing the primary thrust unit with the secondary thrust unit, or solely operating the secondary thrust unit, as disclosed further herein.

In various embodiments, the secondary thrust unit may comprise a "high thrust" unit relative to the primary thrust unit which may comprise a "low thrust" unit. Thus, the secondary thrust unit may be configured to provide a greater maximum thrust relative to a maximum thrust of the primary thrust unit. In various embodiments, the secondary thrust unit may include a motor that is larger than a motor of the primary thrust unit. In various embodiments, the motor of the secondary thrust unit may spin a propeller that is larger in diameter relative to a propeller of the primary thrust unit. Although the present disclosure is not limited in this regard. For example, a maximum thrust output of the primary and secondary thrust units may be varied based on various variables, such as torque of the propeller, mass flow rate, size of the blade, and/or angle of attack (i.e., the pitch of the propeller blades).

In various embodiments, the secondary thrust unit is configured to efficiently operate at lower speeds relative to the primary thrust unit. Thus, the primary thrust unit may be configured as a lower power motor relative to the motor of the secondary thrust unit, in accordance with various embodiments. Additionally, the primary thrust unit may comprise a smaller diameter propeller relative to the secondary thrust unit that will operate efficiently at higher speeds, in accordance with various embodiments. However, the present disclosure is not limited in this regard. For example, the primary thrust unit may comprise a larger diameter propellor relative to the secondary thrust unit that will operate efficiently at loiter and/or cruise phases relative to the secondary thrust unit that may be a smaller diameter propellor relative to the primary thrust unit that operates faster at a higher pitch and more efficiently for dash phases, in accordance with various embodiments.

Exemplary Embodiments

Figure 1B:
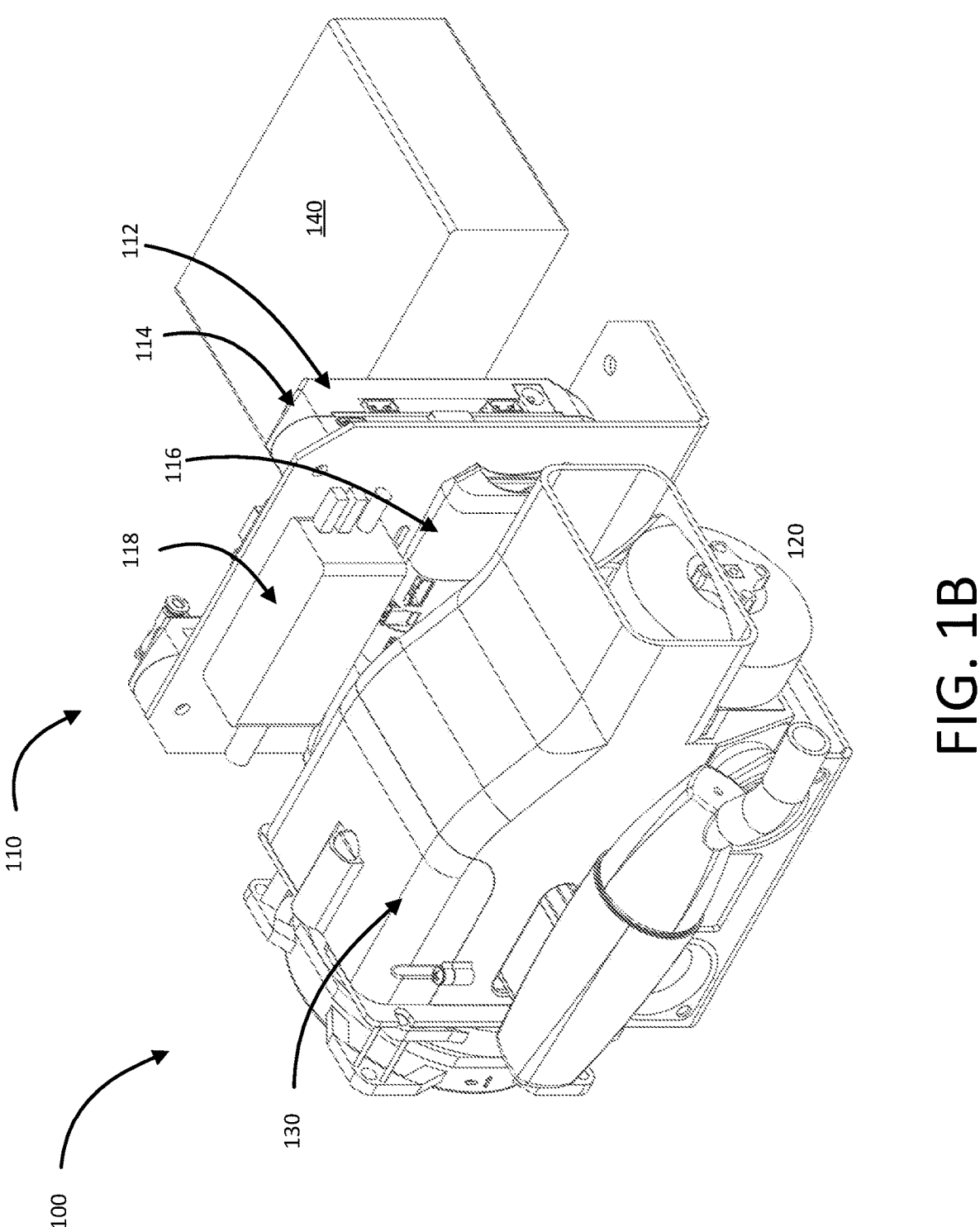
FIG. 1B illustrates a perspective view of hybrid powerplant, in accordance with various embodiments.

Referring now to FIGS. 1A and 1B, a schematic view (FIG. 1A) and a perspective view (FIG. 1B) of a hybrid powerplant 100 for use in a UAV system is illustrated, in accordance with various embodiments. In various embodiments, the hybrid powerplant 100 comprises an electronic control system 110, a generator 120, an engine 130, and an energy storage 140. The electronic control system 110 may comprise an engine control unit 112, a generator management unit 114, and a power rectification system 116 (e.g., an electronic speed control ("ESC"), an active rectifier, or the like). In various embodiments, the hybrid powerplant 100 further comprises an ignition module 118 (as shown in FIG. 1B). The ignition module 118 is configured for firing spark plugs. The timing of firing the spark plugs by the ignition module may ensure the hybrid powerplant 100 runs properly. The ignition module may be in electronic communication with a crankshaft position sensor, or the like to determine when to fire various spark plugs, in accordance with various embodiments.

In various embodiments, the generator 120 is any type of electric motor, such as an alternating current (AC) brushless motor, a direct current (DC) brushed motor, a DC brushless motor, a direct drive motor, a linear motor, a servo motor, a stepper motor, or the like. In various embodiments, the generator 120 is a DC brushless motor, such as a three-phase brushless DC motor, which may be capable of achieving higher performance relative to other motors with a reduced size envelope and lighter weight. The generator 120 may be configured to operate as a motor or a generator. In this regard, in a motor configuration, the generator 120 converts electrical energy (e.g., from the energy storage 140 into mechanical energy (i.e., causing the engine 130 to rotate), for example, to start the engine 130. In a generator configuration, the generator 120 converts mechanical energy (i.e., from the engine 130) into electrical energy (provided to the power rectification system 116) as described further herein.

The engine 130 of the hybrid powerplant 100 is configured to operate at varying speeds. In this regard, the engine 130 is configured to be modulated, by the engine control unit 112, based on commands from the generator management unit 114, to provide a combination of speed and torque to the generator 120 to supply a power output that is optimized for a predetermined parameter, such as efficiency, a decibel level, or the like. The power output may be determined from the generator management unit 114, a main controller of a respective UAV, or the like. The engine 130 is configured to vary the speed and torque supplied to the generator 120 to produce the desired power output based on an optimal power for a specific maneuver, or phase of flight. In this regard, by varying the speed and torque of the engine 130, in combination with additional voltage being supplied from the energy storage 140 occasionally, a significantly wider variance of power may be supplied to the load as described further herein. In various embodiments, the generator management unit 114 may comprise power conversion circuitry that provides conditioned power to the main power bus 160 and/or the energy storage 140.

In various embodiments, the energy storage 140 comprises a battery, a super capacitor, or another energy storage device. In various embodiments, the energy storage 140 is a battery. The energy storage 140 is configured to be electrically isolated from the main power bus 160 in a first state and configured to be electrically coupled to the main power bus 160 in a second state. In this regard, an electrical switch 162 is coupled to an electrical line 161 that is in electrical communication with the energy storage 140. The electrical switch 162 is configured to transition from an open position to a closed position to transition between an electrically isolated state to an electrically coupled state. For example, the electrical switch 162 is in electrical communication with the generator management unit 114. Thus, in response to receiving a command from the generator management unit 114, the electrical switch 162 closes, electrically coupling the energy storage 140 to the main power bus 160 as described further herein. In various embodiments, the electrical switch 162 may comprise a mechanical switch, an electrically-powered switch, or the like. The present disclosure is not limited in this regard.

The power rectification system 116 is also in electrical communication with the generator 120. In various embodiments, when the generator 120 is an AC generator, the power rectification system 116 is further configured to commutate power from the generator 120, turning the alternating current (AC) power into direct current (DC) power with a ripple, adding a capacitance to smooth out the ripple, and supplying the DC power to the main power bus 160 as described further herein.

The engine control unit 112 is configured to control engine 130 based on commands received from the generator management unit 114 and feedback communications received from the engine 130. For example, the engine control unit 112 is configured to control a series of actuators on the engine 130 to ensure optimal engine performance. The engine control unit 112 may receive measurements from various sensors disposed within the engine 130, interpret the sensor data, and adjust the actuators in the engine 130 accordingly. Additionally, the engine control unit 112 may receive commands from the generator management unit 114 as described further herein. Similarly, the power rectification system 116 is also configured to receive commands from the generator management unit 114. In this regard, the generator management unit 114 may be configured as a controller for the hybrid powerplant 100, in accordance with various embodiments.

In various embodiments, the power rectification system 116 includes an ESC. In various embodiments, an ESC can provide more or less motor toque by various means, one of which is known as 'duty cycle' in which the motor control field effect transistors (FETs) are turned on and off, with a percentage of the time they are 'on' being called the duty cycle. Using the duty cycle control, the load can be made to draw more or less current from the variable voltage power bus.

The ESC can be controlled by other, higher level control methods, such as 'current control' and 'speed control', in which the motor's current and speed are provided as commands to the ESC. However, although these methods of control could be utilized with the hybrid powerplant 100, these control methods can be unstable (i.e., disturbances can cause the engine 130 to continually increase or decrease in speed without appropriate changes in the command). By commanding duty cycle to both the generator 120 and the motor controllers results in a system which is naturally stable, as described further herein, and disturbances tend to result in either a new stable speed and power output, or a return to the equilibrium speed and power output, in accordance with various embodiments.

Stated another way, using duty cycle control means that a change in input command propagates throughout the system to result in a new, steady, power output, without any further control input required. The closed-loop control is therefore used to arrive at the desired power output of the load, but high-rate control can be eliminated while maintaining system stability, in accordance with various embodiments.

In various embodiments, the hybrid powerplant 100 comprises various sensor(s) 172, 174. In various embodiments, sensor(s) 172 and sensors 174 are current and/or voltage sensors. The sensor(s) 172 are disposed between the power rectification system 116 and the main power bus 160. Similarly, the sensor(s) 174 are disposed between the energy storage 140 and the main power bus 160 when the energy storage 140 is in electrical communication with the main power bus 160. In various embodiments, the sensor(s) 172, 174 are in electrical communication with the generator management unit 114. In this regard, the sensor(s) 172, 174 are configured to measure current and/or voltage and supply a current data and/or a voltage data to the generator management unit 114. The current data and/or voltage data may then be used by the generator management unit 114 to command the engine control unit 112 to provide more or less speed and/or torque from the engine 130, command the electrical switch 162 to modulate (if the electrical switch 162 is an electronic switch capable of high speed switching) to facilitate the energy storage 140 to discharge more or less current, command the power rectification system 116 to adjust a duty cycle or switch the frequency of transistors to rectify the AC voltage from the generator 120 and provide rectified DC voltage to bus 160 when the generator 120 is in a generator configuration, and/or command the power rectification system 116 to adjust a duty cycle or switch the frequency of transistors to change the rectified voltage provided to bus 160 when the generator 120 is in a generator configuration, and/or command the power rectification system 116 to adjust a duty cycle or switch a frequency of transistors to change a speed of the generator 120 when the generator is in a motor configuration.

In various embodiments, the hybrid powerplant 100 is modular. In this regard, the hybrid powerplant 100 comprises main power interface(s) 182, control interface(s) 184, and fuel system interface(s) 186, in accordance with various embodiments. The main power interface 182 is configured to be coupled to a power bus of a respective UAV system as described further herein. The power bus of the UAV system is in electrical communication with an electrical load of the UAV system (i.e., propellers, fans, etc.). In various embodiments, the fuel system interface(s) 186 may be a port for a fuel pump or the like.

Figure 2:
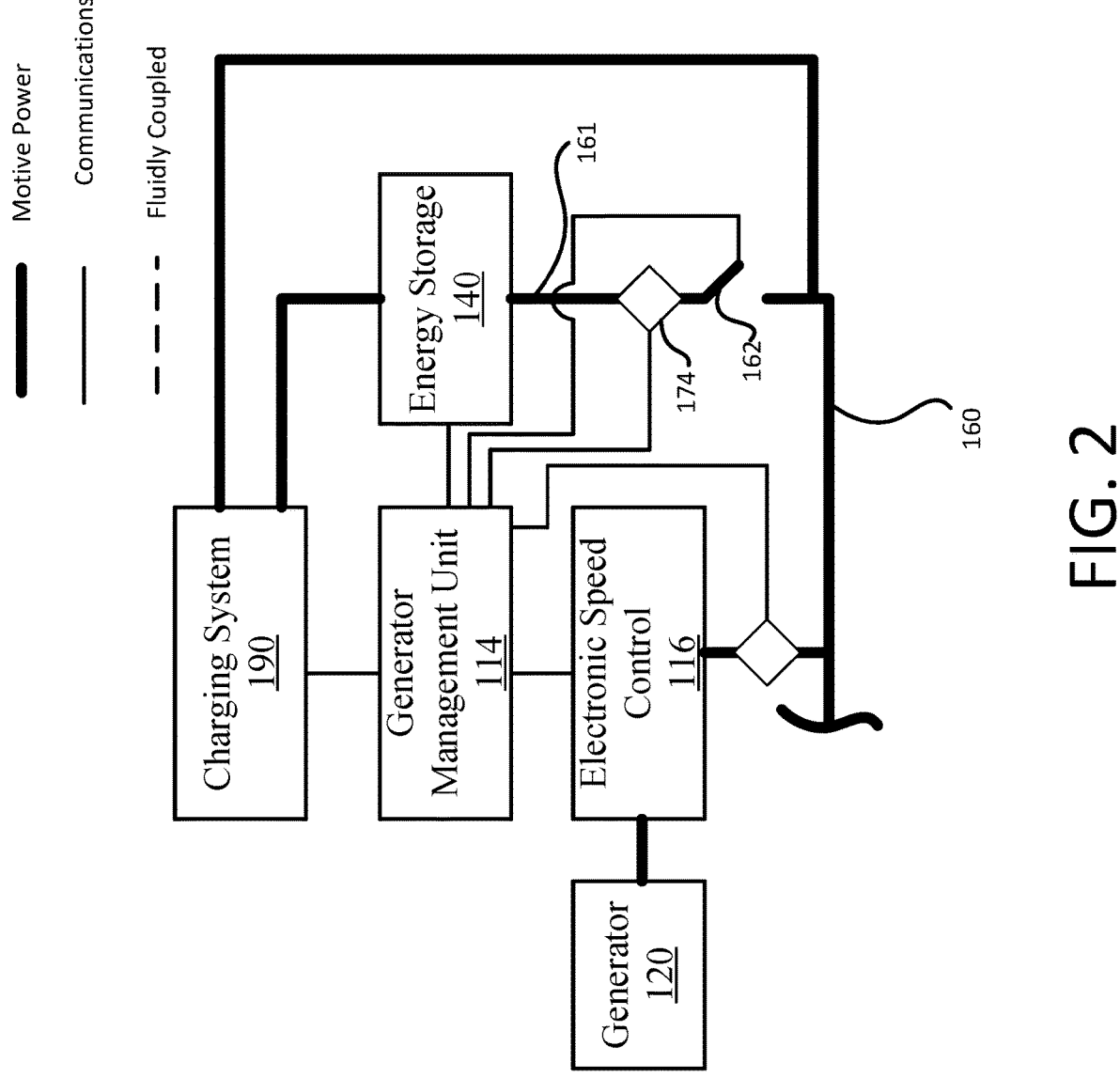
FIG. 2 illustrates a portion of a schematic view of a hybrid powerplant, in accordance with various embodiments.

Referring now to FIG. 2, with like numerals representing like elements, a schematic view of a portion of the hybrid powerplant 100 from FIG. 1A-B, in accordance with various embodiments, is illustrated. In various embodiments, the hybrid powerplant 100 may further comprise a charging system 190 in electrical communication with the generator 120 and the energy storage 140. In this regard, the charging system 190 may utilize the varying power output from the generator 120/power rectification system 116 to provide a charge to the energy storage 140 when the energy storage 140 is disconnected from the main power bus 160 (i.e., electrical switch 162 is open). Thus, after utilizing the energy storage 140 for a high power maneuver or phase of flight, the energy storage 140 may be re-charged during a low power phase of flight (e.g., cruise or loiter) while the energy storage 140 is disconnected from the main power bus 160.

Although the charging system 190 is illustrated as being electrically coupled to the energy storage 140 via an independent electrical line, the present disclosure is not limited in this regard. For example, the charging system 190 may be disposed on electrical line 161 and configured to charge the energy storage 140 in response to the electrical switch 162 being closed and a power output for the load being less than a power output supplied by the generator 120, in accordance with various embodiments.

Figure 3A:
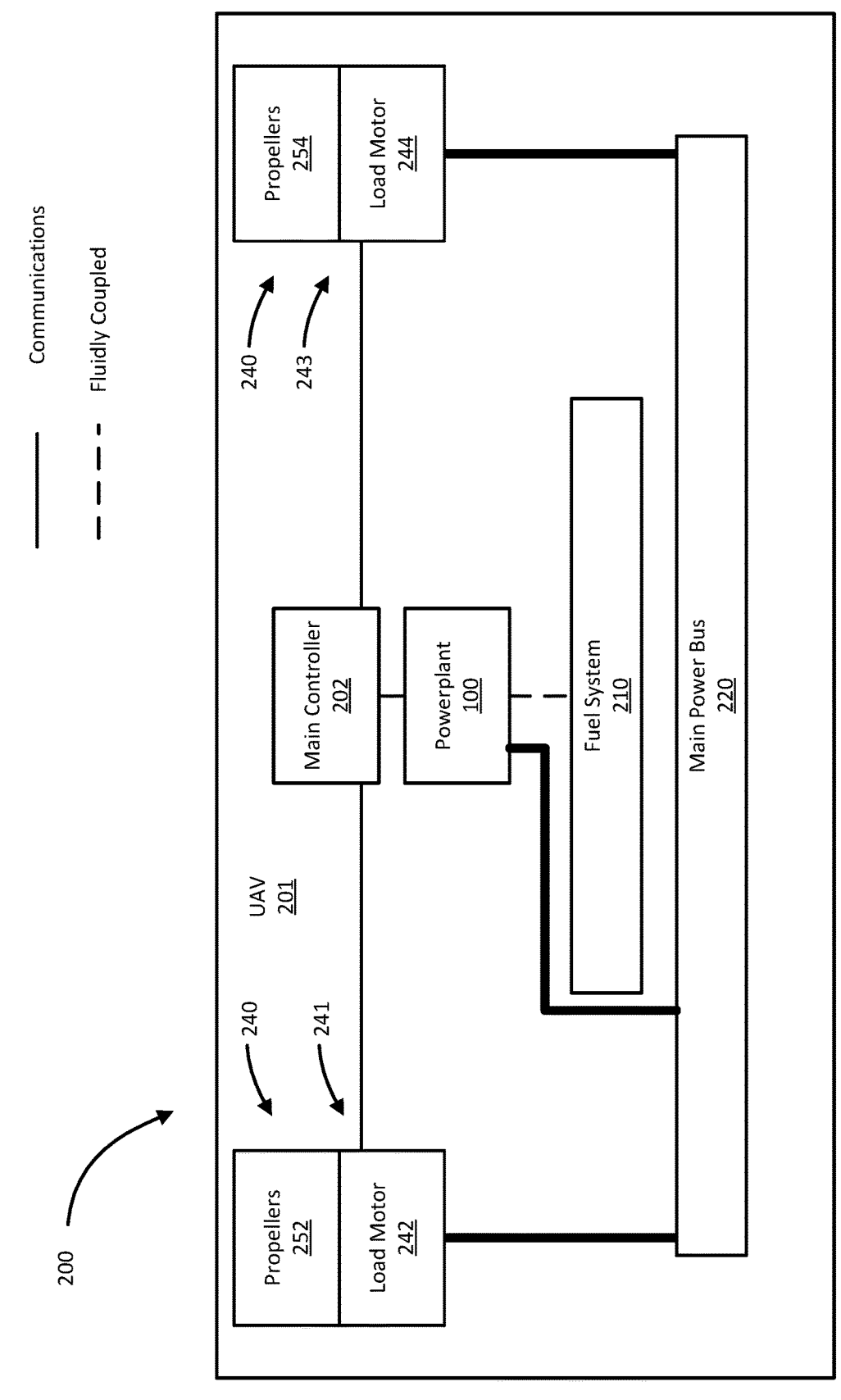
FIG. 3A illustrates a schematic view of a system for use with a hybrid powerplant, in accordance with various embodiments.

Referring now to FIG. 3A, a schematic view of a system 200 (e.g., a UAV system) having a hybrid powerplant 100 from FIG. 1A-B, in accordance with various embodiments. In various embodiments, the system 200 comprises a UAV 201. Although described herein with respect to a UAV, the present disclosure is not limited in this regard. For example, any system utilizing electrical power, hydrogen power, gas power, or the like is within the scope of this disclosure. For example, system 200 could be utilized in motor vehicles, boats, aircrafts, etc.

In various embodiments, the system 200 comprises a main controller 202 in electrical communication with the hybrid powerplant 100. Although described as including a main controller 202 in electrical communication with the hybrid powerplant 100, the present disclosure is not limited in this regard. For example, when the system 200 includes only a single powerplant, the main controller 202 may be a component of the generator management unit 114 of the electronic control system 110 of the hybrid powerplant 100 from FIG. 1A-B. In various embodiments, the main controller 202 is electrically coupled to the control interface 184 of the hybrid powerplant 100 from FIG. 1A-B. In this regard, the main controller 202 is in electrical communication with the generator management unit 114 and configured to provide commands, or instructions, to the generator management unit 114 based on a desired load for a desired phase of flight or maneuver during flight, in accordance with various embodiments.

In various embodiments, main controller 202 may be integrated into computer systems onboard an aircraft (e.g., UAV 201). In various embodiments, main controller 202 may be configured as a central network element or hub to access various systems, engines, and components of system 200. Main controller 202 may comprise a network, computer-based system, and/or software components configured to provide an access point to various systems, engines, and components of system 200. In various embodiments, main controller 202 may comprise a processor. In various embodiments, main controller 202 may be implemented in a single processor. In various embodiments, main controller 202 may be implemented as and may include one or more processors and/or one or more tangible, non-transitory memories and be capable of implementing logic. Each processor can be a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof. Main controller 202 may comprise a processor configured to implement various logical operations in response to execution of instructions, for example, instructions stored on a non-transitory, tangible, computer-readable medium configured to communicate with main controller 202.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se and does not relinquish rights to all standard computer-readable media that are not only propagating transitory signals per se.

In various embodiments, the system 200 further comprises a fuel system 210 in fluid communication with the hybrid powerplant 100. The fuel system 210 is coupled to the fuel system interface 186 of the hybrid powerplant 100 from FIG. 1A-B. In this regard, the fuel system 210 is in fluid communication with the engine 130 of the hybrid powerplant 100 and configured to supply fuel to the engine 130 during operation of the UAV 201. In various embodiments, the fuel system 210 comprises a fuel tank in fluid communication with a fuel pump. The fuel pump is configured to transfer fuel from the fuel tank to a carburetor, or fuel injector, of the engine 130 of the hybrid powerplant 100 from FIG. 1A-B.

In various embodiments, the system 200 further comprises a main power bus 220 in electrical communication with the hybrid powerplant 100. The main power bus 220 is configured to supply a power output to a propulsion system 240 of the UAV 201. In various embodiments, the propulsion system 240 comprises a first load motor 242 operably coupled to a first propellor 252 and a second load motor 244 operably coupled to a second propellor 254. Although illustrated as comprising two pairs of motors/propellors, the present disclosure is not limited in this regard. For example, a single motor/propellor may be utilized, additional motor/propellors may be utilized, a ducted fan or rotor may be utilized, or the like in accordance with various embodiments.

In various embodiments, the first load motor 242 is operably and mechanically coupled to the first propellor 252. In this regard, in response to receiving a motive power from the main power bus 220, the first load motor 242 rotates about a central axis, driving the first propellor 252 and generating a thrust for the UAV 201 as described further herein. Similarly, the second load motor 244 is operably and mechanically coupled to the second propellor 254. Thus, in response to receiving a motive power from the main power bus 220, the second load motor 244 also may rotate about a central axis, driving the second propellor 254 and generating a second thrust for the UAV 201. In various embodiments, the first load motor 242 may be operated independently from the second load motor 244 as described further herein.

In various embodiments, the first load motor 242 and the first propellor 252 may be configured to provide cruise power at low voltage and low power, whereas the second load motor 244 and the second propellor 254 may be configured for a high propellor advance ratio for use in high power, high voltage, and/or low advance ratio (e.g., for a low-speed climb) relative to the first load motor 242 and the first propellor 252.

In various embodiments, the first propellor 252 and/or the second propellor 254 may be configured to vary a pitch during flight of the UAV 201. In this regard, the first propellor 252 and/or the second propellor 254 may facilitate operation in different rotational speed/advance ratio regimes, in accordance with various embodiments.

In various embodiments, the propulsion system 240 comprises a primary thrust unit 241 and a secondary thrust unit 243. In this regard, the primary thrust unit 241 may be sized and configured for a specific phase of flight (e.g., cruise). In this regard, the primary thrust unit 241 may be optimized to be most efficient during cruise flight. In various embodiments, as described further herein, the secondary thrust unit 243 may be off (i.e., not in use) during cruise flight. In this regard, the secondary thrust unit 243 may only be supplied power in response to the main controller 202 transitioning between the specific phase of flight and a phase of flight that utilizes a greater power demand (e.g., landing or dash phases of flight). Similarly, the secondary thrust unit 243 may provide an additional thrust output during launch or the like. In this regard, the primary thrust unit 241 may be sized, configured, and/or optimized for the specific phase of flight outlined above, and the secondary thrust unit 243 may be sized, configured and optimized to provide an additional thrust output for a secondary phase of flight (e.g., launch, dash, or landing).

Figure 3B:
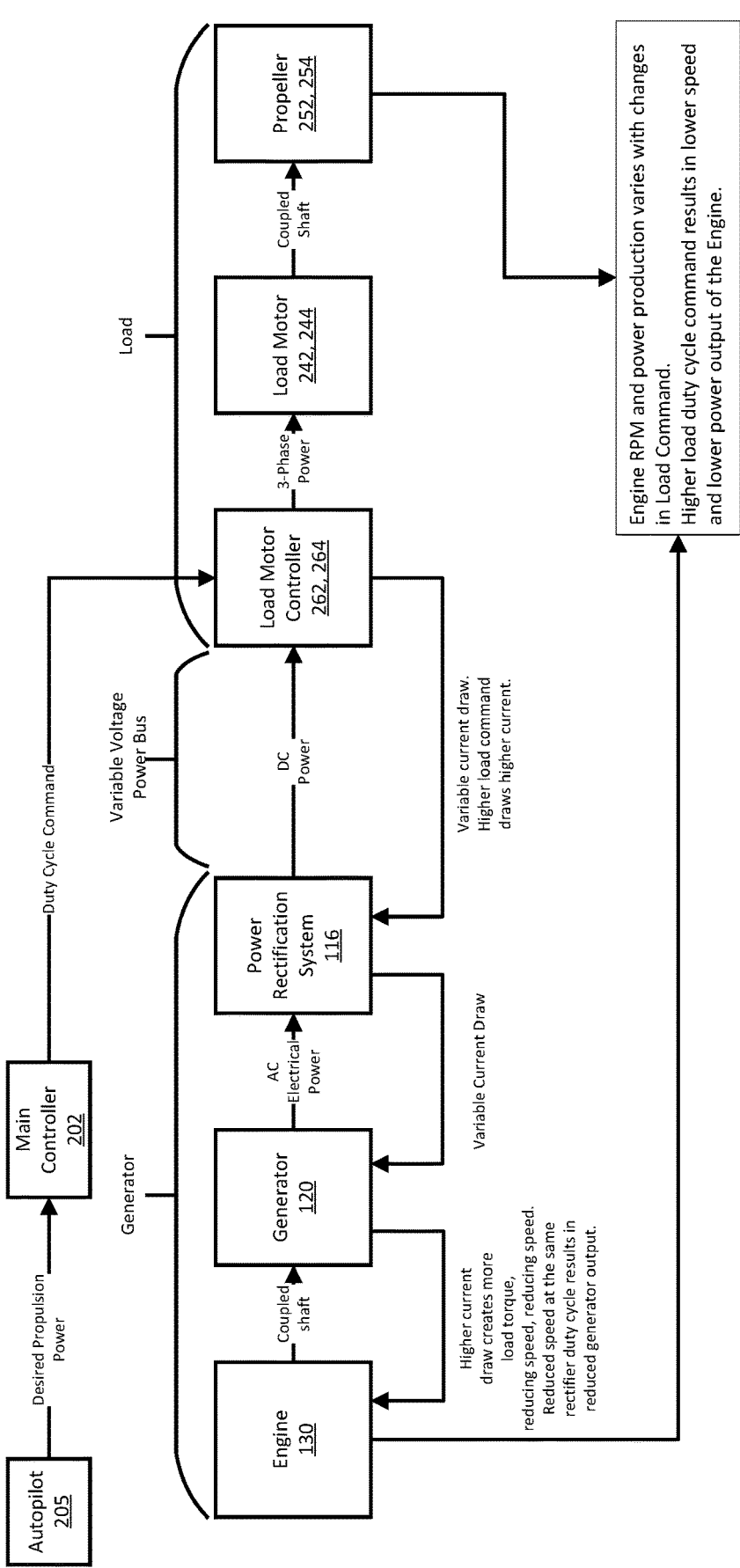
FIG. 3B illustrates a schematic view of a hybrid powerplant in a main operating mode, in accordance with various embodiments.

Referring now to FIG. 3B, a schematic view of the hybrid powerplant 100 operating in a main operating mode is illustrated, in accordance with various embodiments. With brief reference back to FIG. 3A, a "main operating mode" as disclosed herein, refers to a typical operating mode of the hybrid powerplant 100 where the energy storage 140 is disconnected from the main power bus 160 and power demand of the engine 130 is adjusted based on varying a current drawn from the generator 120. In various embodiments, a main operating mode may comprise a cruising operating mode, or the like.

For example, with combined reference now to FIGS. 3A, 3B, and 4A, a process 300 for operating the hybrid powerplant 100 in the main operating mode is illustrated, in accordance with various embodiments. In various embodiments, the process 300 includes starting in the main operating mode (step 302) (e.g., where the electrical switch 162 is open and the energy storage 140 is disconnected from the main power bus 160 from FIG. 1A). In various embodiments, in the main operating mode, the hybrid powerplant 100 can operate at a specified throttle setting and an engine speed. In various embodiments, a throttle setting can be less than or equal to 100%. "Throttle" as disclosed herein is a mechanism configured to manage fluid flow into the engine 130 (e.g., air and/or gas flow). A "throttle setting" as disclosed herein refers to a percentage of fluid flow compared to a maximum fluid flow (i.e., a throttle setting of 50% refers to 50% of a maximum fluid flow rate), in accordance with various embodiments. In this regard, throttle setting at full throttle would be a throttle setting of 100% in accordance with various embodiments. In various embodiments, in the main operating mode, the throttle setting can be approximately 100%, or between 90% and 100%. However, the present disclosure is not limited in this regard. In various embodiments, "approximately" as referred to herein means a tolerance of 2%. In various embodiments, by typically operating in a "full throttle mode", the engine 130 can operate at a maximum compression ratio for the engine 130, and therefore a greatest thermodynamic efficiency for the engine 130. A "maximum compression ratio", as referred to herein, describes a maximum mean effective pressure of the engine 130.

For example, in various embodiments and with combined reference to FIGS. 3A-3B, and 4A, the engine 130 can start in block 302 operating at 5,000 RPM at a throttle setting of 100%, generating 1,000 Watts of shaft power, the load motor controller (e.g., load motor controller 262, 264) can be currently operating at a 50% duty cycle, the load motor (e.g., load motor 242, 244) can be producing 900 Watts of shaft power (i.e., the hybrid powerplant 100 can be operating at 10% loss due to electronic inefficiencies, and a bus voltage on the main power bus 220 can be 30V.

Referring back to FIG. 4A, the process 300 further comprises receiving, via a controller (e.g., load motor controller 262 and/or load motor controller 264), a power demand for an electrical load (e.g., propellor 252 and/or propellor 254) (step 304). In various embodiments, the power demand can be a higher power demand, or a lower power demand, than a power demand at a starting block (i.e., step 302) of process 300. Although described as receiving a power demand, the present disclosure is not limited in this regard. For example, the controller (e.g., load motor controller 262 and/or load motor controller 264) can receive a duty cycle command as described further herein and still be within the scope of this disclosure. In various embodiments, to achieve the higher power demand, the controller (e.g., load motor controller 262 and/or load motor controller 264) can transition from a first duty cycle to a second duty cycle, which can in turn vary a current drawn from a power rectification system 116 based on the power demanded (or duty cycle demanded) in step 304 (step 306). In response to varying the current drawn, by changing the duty cycle from a first duty cycle to a second duty cycle, in step 306, the power rectification system draws the current from a generator 120 of the hybrid powerplant (step 308).

For example, in various embodiments and with combined reference to FIGS. 3A-3B, and 4A, the autopilot 205 can command the main controller 202 to provide a lower power.

In response to the autopilot 205 commanding the main controller 202 to provide the lower power demand, the main controller 202 can command the load motor controller (e.g., load motor controller 262 and/or load motor controller 264) to operate at a higher duty cycle than the duty cycle from the start block 302 (e.g., increase the duty cycle from a 50% duty cycle to a 55% duty cycle). In response to varying the duty cycle from the 50% duty cycle to the 55% duty cycle, a current demand of the load propeller (e.g., propellor 252, 254) increases (i.e., is varied from a starting current from block 302).

Referring back to FIG. 4A, the process 300 further comprises adjusting an engine torque of the engine 130 in response to varying the current drawn from the generator from a first current to a second current (step 310). In various embodiments, the engine torque corresponds to the power demand of step 304. In this regard, by varying the current drawn from the power rectification system in step 306, and maintaining the throttle setting (e.g., as a full throttle mode), the engine torque of the engine 130 increases as the current drawn from the generator 120 increases. As the engine 130 is already at full throttle, the engine 130 cannot provide any additional torque, therefore it slows down. Then, as the engine 130 slows down, a lower voltage is created on the main power bus 220, which creates a lower motor power output.

For example, in various embodiments and with combined reference to FIGS. 3A-3B, and 4A, in response the current produced from the generator 120 increasing from step 308, the engine torque on the engine 130 increases. The engine 130, which is already at full throttle (or set at a desired throttle setting), cannot provide any additional torque, therefore, the engine speed is reduced, which reduces a speed of the generator 120. In response to the speed of the generator 120 being reduced, a lower voltage on the main power bus 220 is generated. In response to a lower bus voltage on the main power bus 220, a lower motor power output is generated. In this regard, the process 300 further comprises stabilizing a power output of the engine 130 at the power demand in response to adjusting the engine torque (step 312). For example, the process 400 can end in block 314 in a new state, relative to the start block 302, where the engine 130 is operating at 4,500 RPM at the throttle setting of 100%, generating 900 Watts of shaft power, the load motor controller (e.g., load motor controller 262, 264) is operating at a 55% duty cycle, the load motor (e.g., load motor 242, 244) is producing 810 Watts of shaft power, and a bus voltage on the main power bus 220 is approximately 27 Volts, in accordance with various embodiments.

Referring now to FIGS. 1A, 3A, and 4B a process 400 for operating the system 200 with the hybrid powerplant 100 in a first mode of operation is illustrated, in accordance with various embodiments. In various embodiments, the process 400 includes starting in a first mode (step 402) (e.g., where the electrical switch 162 is open and the energy storage 140 is disconnected from the main power bus 160 from FIG. 1A). The process 400 further comprises receiving, via a controller, a power demand for an electrical load (step 404). In various embodiments, the controller is a controller of the generator management unit 114 from FIG. 1A-B and the controller is receiving the power demand from the main controller 202 from FIG. 3A. In various embodiments, the controller is the main controller 202 from FIG. 3A and the main controller 202.

The process 400 further comprises commanding, via the controller, the engine 130 to provide an engine speed (e.g., rotational speed in rotations per minute ("RPM")) and an engine torque correlated with the power demand (step 406). In this regard, an optimal engine speed and engine torque for producing the power demand may be provided to the generator 120, resulting in the generator 120 producing the power demand to the power rectification system 116.

The process 400 further comprises receiving, via the controller, a second power demand that is greater than the first power demand (step 408). In various embodiments, the second power demand may be between the power demand of step 404 and a generator maximum power output of the generator 120, but the engine 130 may be unable to physically respond fast enough to reach the second power demand. In various embodiments, the second power demand may be greater than the generator maximum power output of the generator 120. Thus, the process 400 may further comprise determining, via the controller, the second power demand cannot be reached without power supplied by an energy storage (step 410).

In response to step 410, the controller commands an electrical switch 162 to close and electrically couple an energy storage 140 to a main power bus 160 (step 412). In response to the electrical switch closing, the energy storage 140 provides an additional power output to meet the second power demand from step 408. Thus, the generator 120 may be unloaded, allowing the engine 130 to accelerate to an appropriate speed based on the second power demand.

The process 400 further comprises commanding, via the controller, the engine 130 to accelerate to a second speed and a second engine torque correlated with the second power demand (step 416). In this regard, an optimal engine speed and engine torque for producing the second power demand (when the second power demand is between the first power demand and the generator maximum power output) may be provided to the generator 120, resulting in the generator 120 producing the second power demand to the power rectification system 116. In various embodiments, if the second power demand is greater than a maximum power output of the generator 120, the energy storage 140 may remain connected until the power desired is reduced or the energy storage 140 runs out of power.

The process 400 further comprises commanding, via the controller, the electrical switch 162 to open and disconnect the energy storage from the main power bus 160 in response to determining the engine 130 is operating at the second speed and the second engine torque (step 418). In this regard, the system 200 may continue to operate at the second power demand with the power being supplied solely by the generator 120 (step 420) when the second power demand is between the first power demand and the generator maximum power output. In this regard, process 400 may facilitate a smooth and efficient transition from a first power demand to a second power demand by supplying an additional power output from the energy storage 140, transitioning the engine 130 to an optimal speed and torque for the second power demand, and then solely operating the system 200 via the generator 120 in response to the engine 130 operating at the optimal speed and torque for the second power demand. In various embodiments, when the second power demand is greater than the generator maximum power output, the energy storage 140 may remain electrically connected to the main power bus 160 until the controller receives a third power demand that is below the generator maximum power output.

Referring now to FIGS. 1A, 3A, and 5, a process 500 for operating the system 200 with the hybrid powerplant 100 in a second mode of operation is illustrated, in accordance with various embodiments. In various embodiments, the process 500 includes starting in a second mode (step 502) (e.g., where the electrical switch 162 is closed and the energy storage 140 is in electrical communication with the main power bus 160 from FIG. 1A).

The process 500 further comprises receiving, via a controller, a first power demand for an electrical load (step 504). In various embodiments, the controller is a controller of the generator management unit 114 from FIG. 1A-B and the controller is receiving the power demand from the main controller 202 from FIG. 3A. In various embodiments, the controller is the main controller 202 from FIG. 3A.

The process 500 further comprises determining, via the controller, a second power demand for charging an energy storage 140 (step 506). In various embodiments, the energy storage 140 may have been previously utilized in accordance with process 400 from FIG. 4B. In this regard, the energy storage 140 may comprise a reduced state of charge. Thus, the controller may determine that the energy storage 140 should be re-charged in accordance with step 506.

The process 500 further comprises commanding, via the controller, the engine 130 to provide an engine speed and an engine torque correlated with a total power demand (step 508). The total power demand includes the first power demand of step 504 and the second power demand of step 506. In this regard, in response to step 508, a power output from the generator 120 is configured to power the electrical load and charge the energy storage 140. Thus, the process 500 may facilitate re-charging of the energy storage 140 during operation of the UAV 201 with system 200 disclosed herein.

The process 500 may further comprise determining, via the controller, the energy storage 140 is charged (step 510). The controller may determine the energy storage 140 is charged in response to receiving a state of charge data from a sensor of the energy storage 140, in accordance with various embodiments.

The process 500 may further comprise commanding, via the controller, the engine 130 to provide a second engine speed and a second engine torque correlated with the first power demand from step 504 (step 512). In this regard, after the energy storage 140 is re-charged from step 508, the controller may determine it is more efficient to operate with only the generator and operating in accordance with the first power demand of step 504.

Thus, the process 500 may further comprise commanding, via the controller, an electrical switch 162 to open and disconnect the energy storage 140 from the main power bus 160 in response to the engine 130 reaching the second engine speed and the second engine torque correlated with the first power demand from step 504 (step 514). In this regard, upon re-charging the energy storage 140, the controller may transition the hybrid powerplant from the second mode of operation (e.g., at start step 502) to the first mode of operation (e.g., at start step 402 from FIG. 4B) and end at step 516.

Figure 6:
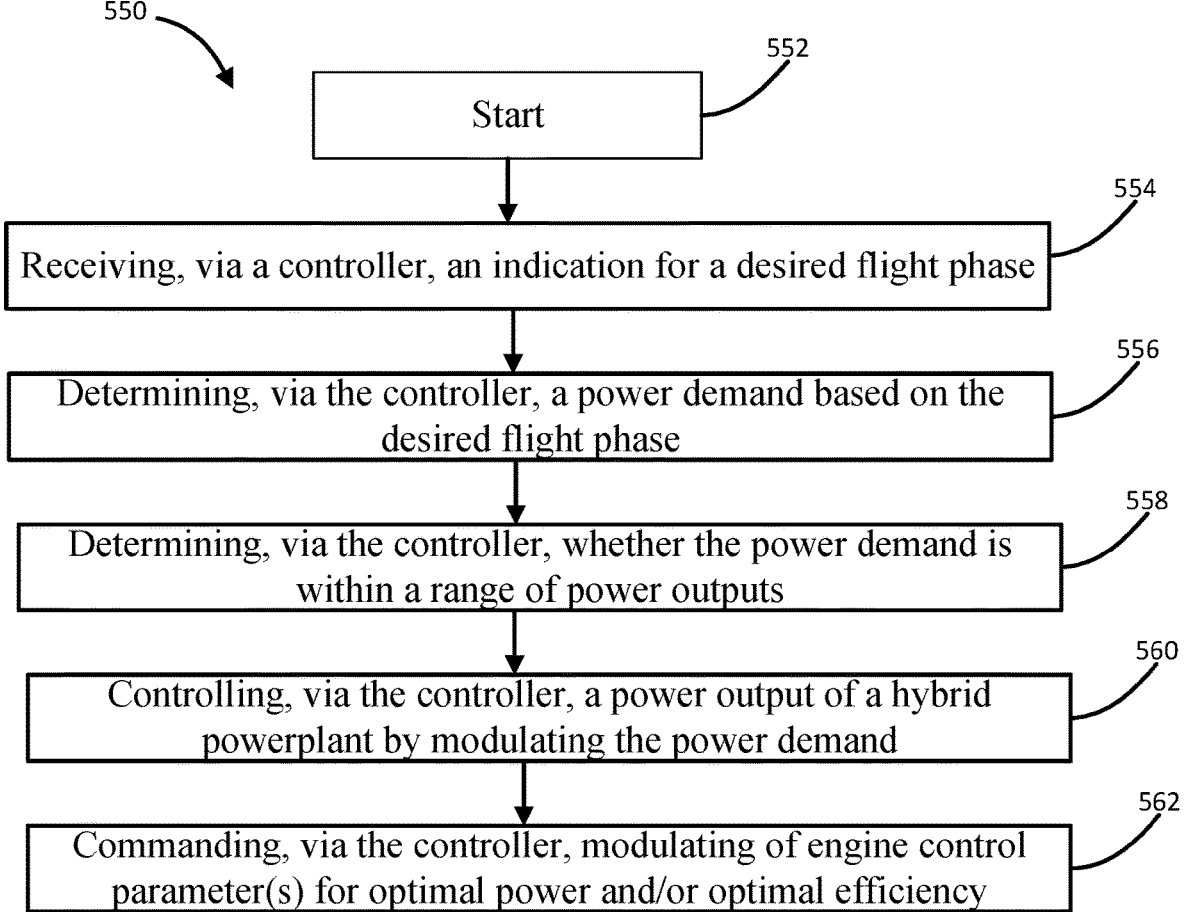
FIG. 6 illustrates a process for operating a system of FIG. 3A, in accordance with various embodiments.

Referring now to FIGS. 1A, 3A, and 6, a process 550 for operating the system 200 with the hybrid powerplant 100 in a mode of operation is illustrated, in accordance with various embodiments. In various embodiments, the process 550 may start with the engine 130 and the generator 120 currently running and the energy storage 140 disconnected from the bus 160 (start block 552).

The process 550 further comprises receiving, via the main controller 202, an indication for a desired flight phase (step 554) and determining a power demand based on the desired flight phase (step 556). The process 550 further comprises determining whether the power demand is within a range of power outputs (step 558). In response to being within the range of outputs, the engine 130 may be commanded, via the main controller 202, to operate at full throttle and allow the rotational speed of the engine to be controlled by the power demand of the load motors 242, 244. In this regard, a rotational speed of the generator 120, and a resultant voltage produced from the generator 120, may also be controlled by the power demand of the load motors 242, 244.

If the load motors 242, 244 are commanded to draw high current (i.e., a high motor electronic speed control switching duty cycle), the load on the generator 120 will be high, the rotational speed of the generator 120 and the engine 130 will reduce, the bus voltage will reduce, and the hybrid powerplant 100 will output lower relative power. If the load motors 242, 244 are commanded to draw low current (i.e., a low electronic speed control switching duty cycle), the load on the generator 120 will be low, the rotational speed of the generator 120 and the engine 130 will increase, the bus voltage will increase, and the hybrid powerplant 100 will output high relative power. In this way, the load motors 242, 244 (commanded by the main controller 202) can control the power output of the hybrid powerplant 100 by modulating their current demand (step 560). In this regard, the process 550 further comprises modulating, via the main controller 202, engine control parameter (e.g., throttle position, spark advance, fueling, etc.) for optimal power and/or optimal efficiency (step 562), in accordance with various embodiments.

Figures 7, 8:
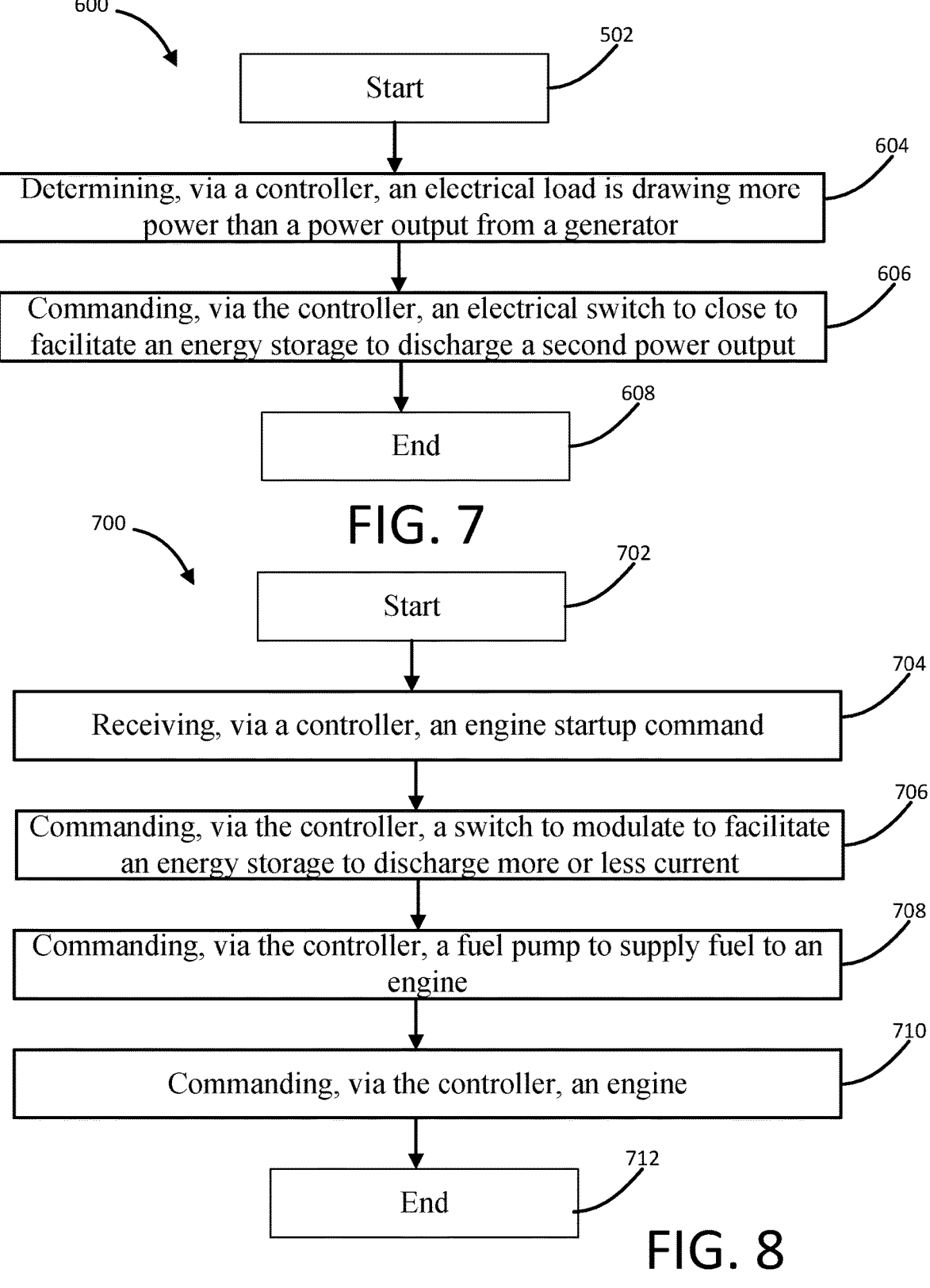
FIG. 7 illustrates a process for operating a system of FIG. 3A, in accordance with various embodiments.
FIG. 8 illustrates a process for operating a system of FIG. 3A, in accordance with various embodiments.

Referring now to FIGS. 1A, 3A, and 7, a process 600 for operating the system 200 with the hybrid powerplant 100 in the second mode of operation from process 500 is illustrated, in accordance with various embodiments. In various embodiments, the process 600 includes starting in the second mode (step 502 from FIG. 5) (e.g., where the electrical switch 162 is closed and the energy storage 140 is in electrical communication with the main power bus 160 from FIG. 1A).

The process 600 further comprises determining, via the controller, an electrical load is drawing more power than a power output from a generator 120 (step 604). In response to the electrical load drawing more power than the generator 120 can provide, the engine 130 may naturally slow down, further reducing a voltage produced by the generator 120. In this regard, the controller may proceed to command an electrical switch to close in order to facilitate providing additional energy from an energy storage 140 to provide the additional power to meet a power demand of the electrical load (step 606). Thus, the process 600 may ensure that a power demand is met in response to the electrical load drawing more power than the generator 120 can provide and end at step 608.

Referring now to FIGS. 1A, 3A, and 8, a process 700 for starting the hybrid powerplant 100 of the system 200 in a third mode of operation is illustrated, in accordance with various embodiments. In various embodiments, the process 700 includes starting in a third mode (e.g., where the electrical switch 162 is closed and the energy storage 140 is in electrical communication with the main power bus 160 from FIG. 1A and the engine 130 is off) (step 702). In various embodiments, the process 700 further comprises receiving, via a controller, an engine startup command (step 704).

The process 700 further comprises commanding, via the controller, an electrical switch 162 to modulate (if the electrical switch 162 is an electronic switch capable of high-speed switching) an energy storage 140 to discharge a current to power a generator 120 (step 706). In this regard, the generator 120 is in a motor configuration during a startup mode of the engine 130. In response to receiving the current, the generator 120 draws power from the energy storage 140, causing the engine 130 to rotate.

The process 700 further comprises commanding a fuel pump of a fuel system 210 to supply fuel to the engine 130 (step 708) and commanding via the controller, an engine control unit 112 to supply a spark into a cylinder of the engine 130 (step 710). Thus, in response to the engine 130 rotating, the fuel being injected into the cylinder of the engine 130 and the spark being supplied, the engine 130 starts and the process 700 ends (step 712).

Figure 9:
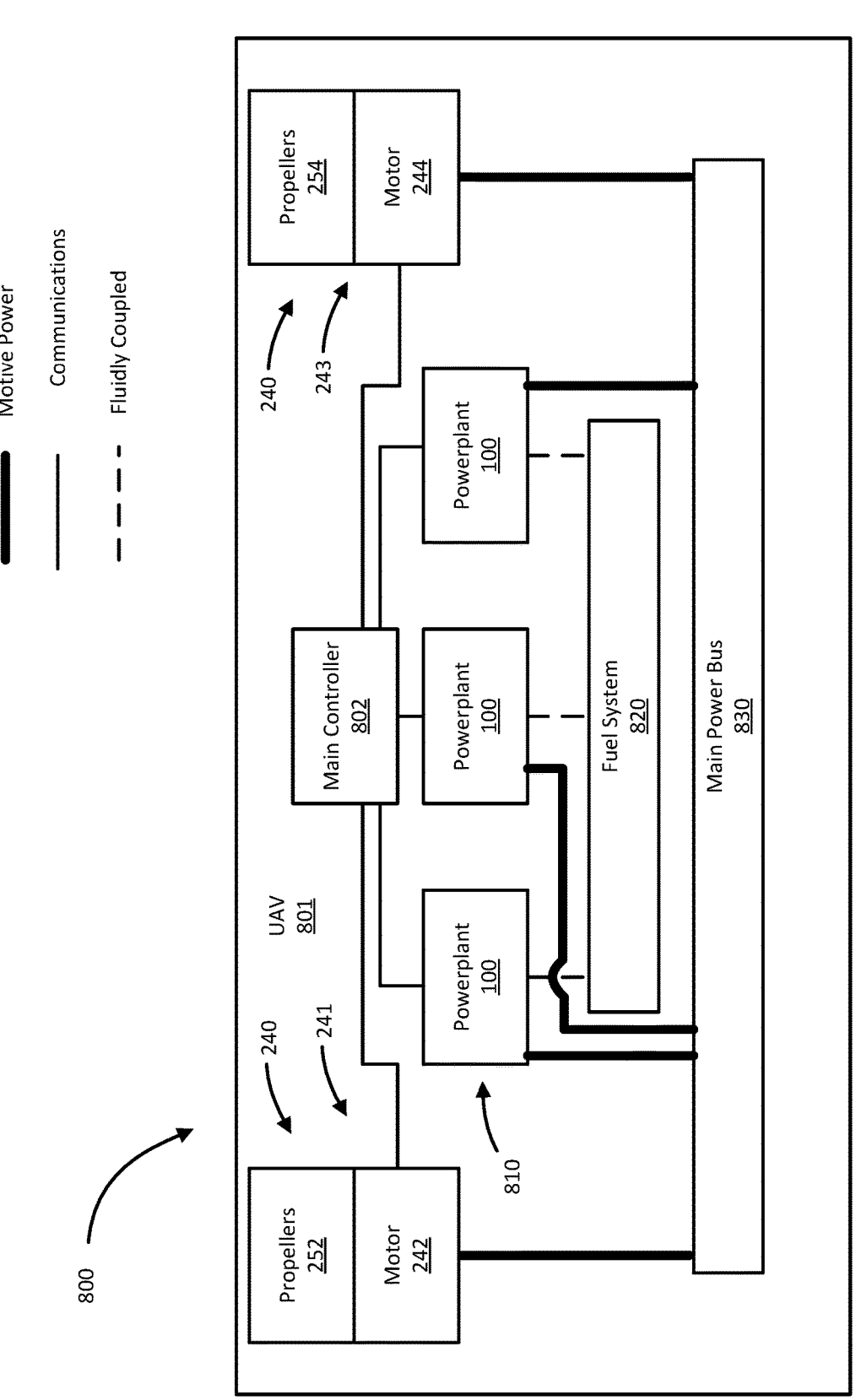
FIG. 9 illustrates a schematic view of a system for use with a plurality of hybrid powerplants, in accordance with various embodiments.
Figure 12:
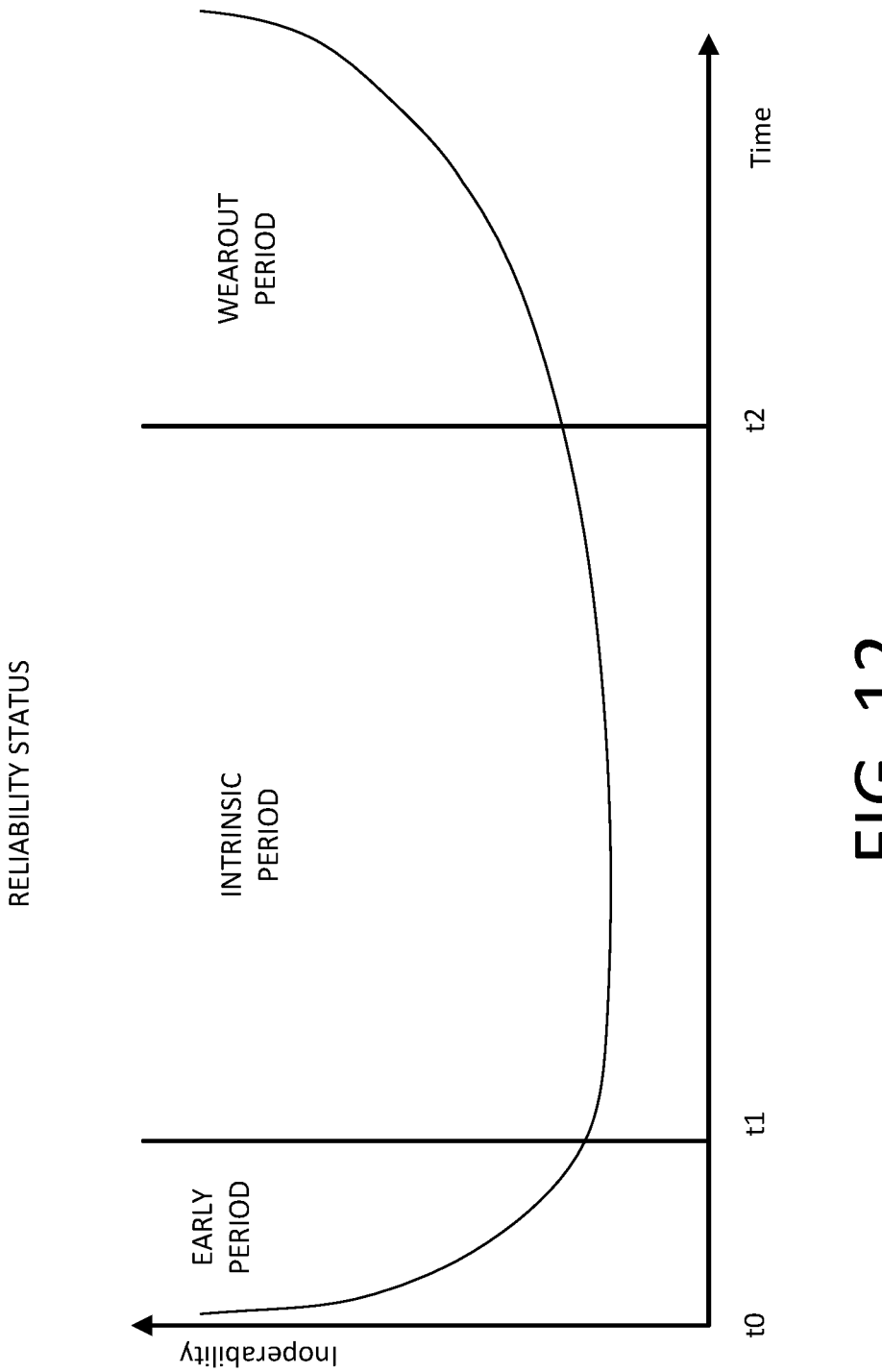
FIG. 12 illustrates a reliability plot for powerplants, in accordance with various embodiments.

Referring now to FIG. 9, a schematic view of a system 800 (e.g., a UAV system) is illustrated, in accordance with various embodiments. In various embodiments, the system 800 comprises a main controller 802 in electrical communication with a plurality of hybrid powerplants 810. Each hybrid powerplant in the plurality of hybrid powerplants 810 may comprise the hybrid powerplant 100 from FIGS. 1A-B. In various embodiments, the main controller 802 is electrically coupled to the control interface 184 of each hybrid powerplant 100 in the plurality of hybrid powerplants 810.

In various embodiments, main controller 802 may be integrated into computer systems onboard an aircraft (e.g., UAV 801). In various embodiments, main controller 802 may be configured as a central network element or hub to access various systems, engines, and components of system 800. Main controller 802 may comprise a network, computer-based system, and/or software components configured to provide an access point to various systems, engines, and components of system 200. In various embodiments, main controller 802 may comprise a processor. In various embodiments, main controller 802 may be implemented in a single processor. In various embodiments, main controller 802 may be implemented as and may include one or more processors and/or one or more tangible, non-transitory memories and be capable of implementing logic. Each processor can be a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof. Main controller 802 may comprise a processor configured to implement various logical operations in response to execution of instructions, for example, instructions stored on a non-transitory, tangible, computer-readable medium configured to communicate with main controller 802.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se and does not relinquish rights to all standard computer-readable media that are not only propagating transitory signals per se.

In various embodiments, the system 800 further comprises a fuel system 820 in fluid communication with each hybrid powerplant 100 in the plurality of hybrid powerplants 810. The fuel system 820 is coupled to the fuel system interface 186 of each hybrid powerplant 100 from FIGS. 1A and 1B. In this regard, the fuel system 820 is in fluid communication with the engine 130 of each hybrid powerplant 100 in the plurality of hybrid powerplants 810 and configured to supply fuel to an engine 130 of a hybrid powerplant 100 in the plurality of hybrid powerplants 810 during operation of the UAV 201 in accordance with the processes described further herein. In various embodiments, the fuel system 820 comprises a fuel tank in fluid communication with a fuel pump. The fuel pump is configured to provide pressure and/or transfer fuel from the fuel tank to a carburetor, or fuel injector, of the engine 130 of each hybrid powerplant 100 from FIGS. 1A and 1B. Although illustrated as comprising a single fuel system 820, the present disclosure is not limited in this regard. For example, each hybrid powerplant 100 in the plurality of hybrid powerplants 810 may comprise its own fuel system 820, in accordance with various embodiments.

In various embodiments, the system 800 further comprises a main power bus 830 in electrical communication with each hybrid powerplant 100 in the plurality of hybrid powerplants 810. The main power bus 830 is configured to supply a power output to a propulsion system 240 of the UAV 801. In various embodiments, the propulsion system 240 comprises the first load motor 242, the first propellor 252, the second load motor 244, and the second propellor 254.

In various embodiments, the system 800 is configured to cycle engines 130 of the hybrid powerplants 100 in the plurality of hybrid powerplants 810 on and off to independently balance power, balance load, and/or distribute wear as described further herein. In this regard, the generator unit for each hybrid powerplant 100 in the plurality of hybrid powerplants may be designed for, and configured to run in a small, highly efficient operating range. In this regard, in response to an engine exceeding a predetermined specific fuel consumption ("SFC") (e.g., above 5% of the predetermined SFC). By configuring the hybrid powerplants 100 in the plurality of hybrid powerplants 810 to operate within a small highly efficient operating range, the individual SFC of each hybrid powerplant 100 in the plurality of hybrid powerplants 810 may be optimized.

Furthermore, independent hybrid powerplants 100 in the plurality of hybrid powerplants 810 may provide a redundancy benefit as the UAV 801 would be operable if one of the hybrid powerplants 100 in the plurality of hybrid powerplants 810 were inoperable, in accordance with various embodiments.

The system 800 may further facilitate wear distribution between engines 130 from FIGS. 1A and 1B in the hybrid powerplants 100 of the plurality of hybrid powerplants 810. For example, a first hybrid powerplant in the plurality of hybrid powerplants 810 may be configured to always be in operation, a second hybrid powerplant in the plurality of hybrid powerplants 810 may be configured to provide additional power for certain phases of flight, and/or a third hybrid powerplant in the plurality of hybrid powerplants 810 may be operable to achieve maximum power or to achieve near maximum power. In this regard, throughout operation of the UAV 801, each hybrid powerplant may be in different stages of a life cycle for the respective hybrid powerplant relative to other hybrid powerplants in the plurality of hybrid powerplants 810. Thus, by each hybrid powerplant in the plurality of hybrid powerplants 810 comprising different stages of wear, a probability that two hybrid powerplants in the plurality of hybrid powerplants 810 become inoperable may be greatly reduced, in accordance with various embodiments.

Referring now to FIGS. 9 and 10, a process 900 for operating the system 800 with the plurality of hybrid powerplants 810 in a first mode of operation is illustrated, in accordance with various embodiments. In various embodiments, the process 900 includes starting in a first mode (step 902) (e.g., where the hybrid powerplants 100 in the plurality of hybrid powerplants 810 are configured to operate sequentially). The process 900 further comprises receiving, via a main controller 802, a power demand for an electrical load (step 904).

The process 900 further comprises commanding, via the main controller 802, a first hybrid powerplant in the plurality of hybrid powerplants 810 to provide the power demand (step 906). In various embodiments, prior to step 908, the main controller 802 may determine that the power demand can be met solely by the first hybrid powerplant. In various embodiments, each hybrid powerplant in the plurality of hybrid powerplants 810 may be configured to operate in accordance with processes 300, 400, 500, 600, 700 as described previously herein.

The process 900 further comprises receiving via the main controller 802, a second power demand that is greater than the first power demand (step 908). In this regard, the second power demand may be for a phase of flight that uses greater power relative to the first power demand (e.g., transitioning from a cruise phase to a dash phase, or the like).

The process 900 further comprises determining, via the controller, the second power demand cannot be reached with only the first hybrid powerplant (step 910). In this regard, the second power demand may be greater than a maximum power output for the first hybrid powerplant in the plurality of hybrid powerplants 810. Thus, the main controller 802 may proceed to command a second hybrid powerplant to provide an additional power output to the main power bus 830 (step 912). Thus, a total power provided to the propulsion system 240 may include a first power output provided by the first hybrid powerplant and the additional power output provided by the second hybrid powerplant.

The process 900 further comprises receiving, via the controller, a third power demand greater than the second power demand (step 914). The third power demand may be for a phase of flight that utilizes a maximum power output of the system 800, or a near maximum power output of the system (e.g., a rapid climb phase, a take-off phase, or the like). In various embodiments, in response to receiving the third power demand, the main controller 802 may determine the third power demand cannot be reached with the first hybrid powerplant and the second hybrid powerplant in the plurality of hybrid powerplants 810 (step 916). In this regard, the third power demand may be greater than a maximum power output of the first hybrid powerplant combined with a maximum power output of the second hybrid powerplant. Thus, the controller may proceed to command a third hybrid powerplant to provide a second additional power output to meet the third power demand (step 918).

Although described herein with respect to three hybrid powerplants, the process 900 and system 800 are not limited in this regard. For example, additional hybrid powerplants may be utilized and be within the scope of this disclosure. Process 900 may facilitate a mode of operation where the first powerplant is utilized the most often, the second powerplant is utilized the next most often, the third powerplant is utilized the next most often, and so on. In this regard, reliability of system 800 may be greatly enhanced, as the UAV system may maintain operability in response to the most used powerplant (e.g., the first hybrid powerplant) becoming inoperable. Furthermore, servicing intervals for the system 800 may be changed from an interval based service interval (or on schedule service interval) to a condition based interval (e.g., replacing a hybrid powerplant due to the hybrid powerplant becoming inoperable), in accordance with various embodiments. In this regard, a life of each hybrid powerplant may be increased in system 800 and a life of system 800 may be increased relative to typical UAV systems, in accordance with various embodiments.

Furthermore, with brief reference to FIG. 1A, the hybrid powerplant 100 disclosed herein is highly modular as described previously herein. In this regard, replacement of a hybrid powerplant in the plurality of hybrid powerplants 810 of FIG. 9 may be relatively straightforward and relatively quick relative to typical UAV systems.

Referring now to FIGS. 9 and 11, a process 1000 for operating the system 800 with the plurality of hybrid powerplants 810 in a second mode of operation is illustrated, in accordance with various embodiments. In various embodiments, the process 1000 includes starting in a second mode (step 1002) (e.g., where the hybrid powerplants 100 order of operation is determined based on a reliability status of each hybrid powerplant in the plurality of hybrid powerplants 810). The process 1000 further comprises receiving, via a main controller 802, a power demand for an electrical load (step 1004).

The process 1000 further comprises determining, via the main controller 802, a reliability status for each hybrid powerplant in the plurality of hybrid powerplants 810 (step 1006). With brief reference to FIG. 11, the reliability status may be determined based on a total time a hybrid powerplant has been in operation. For example, a first reliability status may correspond to an early period (e.g., from a starting point in service t0 to a first predetermined time t1). In the early period, the hybrid powerplant may be less reliable relative to an intrinsic period as defined further herein. In this regard, a hybrid powerplant may be more susceptible to becoming inoperable during the early period relative to the intrinsic period, in accordance with various embodiments. A second reliability status may correspond to the intrinsic period (e.g., between the first predetermined time t1 and a second predetermined time t2). In this regard, during the intrinsic period, a hybrid powerplant may be most reliable. Lastly, a reliability status may correspond to a wear-out period (e.g., between the second predetermined time t2 and an end of life for the hybrid powerplant). During the wear-out period, the hybrid powerplant may become increasingly less reliable.

The process 1000 further comprises determining, via the controller, an order of use for each hybrid powerplant in the plurality of hybrid powerplants based on the reliability status (step 1008) and commanding, via the controller, a hybrid powerplant to provide the power demand based on the reliability status (step 1010). In this regard, each hybrid powerplant in the plurality of hybrid powerplants 810 may or may not start with a same or similar time in service. In this regard, the process 1000 may base an order of operation of each hybrid powerplant on ensuring each hybrid powerplant in the plurality of hybrid powerplants reaches the intrinsic period as quickly as possible. Thus, in response to one hybrid powerplant being in the early period, and a remainder of hybrid powerplants being in the intrinsic period, the hybrid powerplant in the early period may be operated first, as opposed to operating a hybrid powerplant with a most time in service in accordance with process 900. If all hybrid powerplants are in the early period, the main controller 802 may operate in accordance with process 900 until a first hybrid powerplant reaches the intrinsic period. Then, the first hybrid powerplant will revert to last in an order of operation for the plurality of hybrid powerplants 810, and a second hybrid powerplant may be operated first until the second hybrid powerplant reaches the intrinsic period. Then, once the second hybrid powerplant reaches the intrinsic period, the second hybrid powerplant may revert to last in the order of operations for the plurality of hybrid powerplants 810, and a third hybrid powerplant may be operated first until the third hybrid powerplant reaches the intrinsic period.

In various embodiments, once all hybrid powerplants in the plurality of hybrid powerplants 810 reaches the intrinsic period, the process 1000 may end (step 1012), and the system 800 may operate in accordance with process 900.

Figure 13:
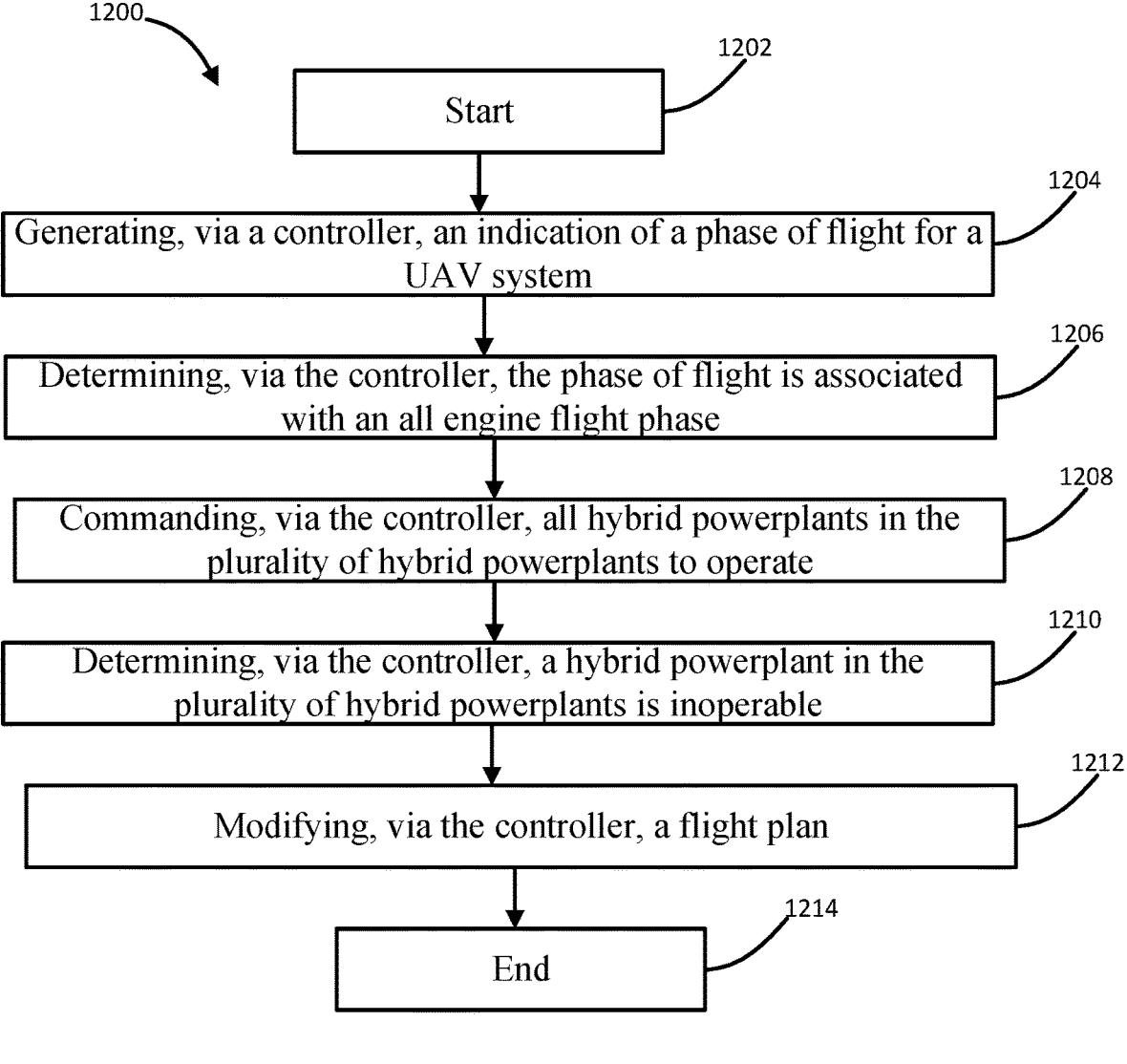
FIG. 13 illustrates a process for operating a system of FIG. 9, in accordance with various embodiments.

Referring now to FIGS. 9 and 13, a process 1200 for operating the system 800 with the plurality of hybrid powerplants 810 in a third mode of operation is illustrated, in accordance with various embodiments. In various embodiments, the process 1200 includes starting in a third mode (step 1202). The third mode may be started in initially (i.e., during pre-flight and launch) or transitioned into based on detecting a recovery phase of flight, in accordance with various embodiments. The process 1200 comprises receiving, via a main controller 802, an indication of a phase of flight (step 1204).

The process 1200 further comprises determining, via the main controller 802, the phase of flight is associated with an all engine flight phase (step 1206). An all engine flight phase may be a pre-flight phase, a launch phase, a recovery phase, operation over a heavily populated area, low-altitude operation, etc. In this regard, the all engine flight phases may be determined based on phases of flight where use of all engines would be desirable, whether for availability of maximum power quickly if desired, or minimization of flight disruption due to malfunctioning of one powerplant. In various embodiments, in response to determining the phase of flight is one of the preflight phase, the launch phase, or the recovery phase, the main controller 802 may command all hybrid powerplants in the plurality of hybrid powerplants 810 to operate (step 1208). In this regard, process 1200 may affirm that all of the hybrid powerplants in the plurality of hybrid powerplants 810 are in operation to ensure that maximum power is available for critical segments of flight, or to minimize disruption to the flight in the event of a powerplant malfunction.

In various embodiments, if the main controller 802 determines a hybrid powerplant in the plurality of hybrid powerplants 810 is inoperable (step 1210), the main controller 802 may modify a flight plan (step 1212) to account for the inoperable hybrid powerplant. In various embodiments, the remainder of the flight plan is operated in accordance with the modified flight plan of step 1212 (step 1214).

Figure 14:
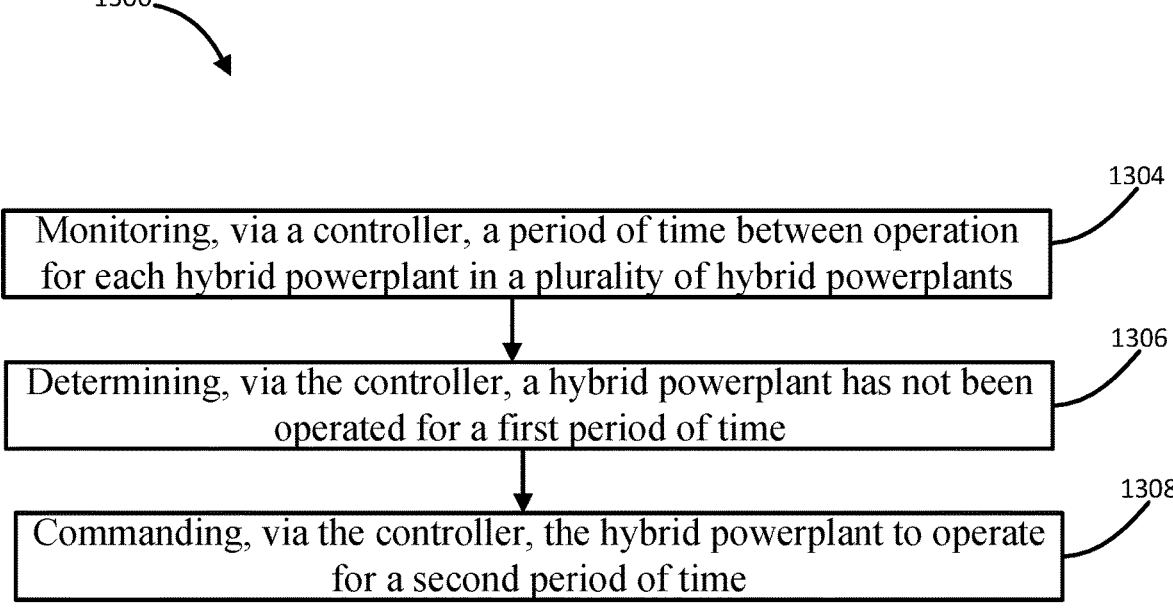
FIG. 14 illustrates a process for operating a system of FIG. 9, in accordance with various embodiments.

Referring now to FIGS. 9 and 14, a process 1300 for operating the system 800 with the plurality of hybrid powerplants 810 in a fourth mode of operation is illustrated, in accordance with various embodiments. In various embodiments, although described herein with respect to several modes, multiple modes may be operated simultaneously. For example, the fourth mode illustrated by process 1300 may be operated during first mode of process 900 from FIG. 9, during second mode of process 1000 from FIG. 10, and/or during third mode of process 1200 from FIG. 13. In various embodiments, the system 800 may continuously monitor, via the main controller 802, a period of time between operation for each hybrid powerplant in the plurality of hybrid powerplants 810 (step 1304).

In response to determining, via the main controller 802, a hybrid powerplant in the plurality of hybrid powerplants 810 has not been operated for a first period of time (step 1306), the main controller 802 may command the hybrid powerplant to operate for a second period of time (step 1308). Thus, the process 1300 may reduce any effects of corrosion on the engine 130 of each hybrid powerplant 100 from FIGS. 1A-B by periodically running an engine of a hybrid powerplant in the plurality of hybrid powerplants 810 that has not been operated for the first period of time in accordance with step 1306. Additionally, the process 1300 may be utilized for temperature control when operating in cold conditions, or the like. The first period of time may be pre-determined based on an anticipated corrosion build up or the like. The second period of time may be pre-determined based on an anticipated time duration to eliminate any corrosion buildup due to the hybrid powerplant not being operated for the first period of time.

Referring now to FIGS. 3A, 9, and 15, a process 1400 for operating systems 200, 800 with the primary thrust unit 241 and the secondary thrust unit 243 during a predetermined flight plan is illustrated, in accordance with various embodiments.

The process 1400 comprises receiving, via a main controller 202, 802, a power demand for a takeoff event (step 1402). The takeoff event may be a high power and/or high speed event for the propulsion system 240 relative to other phases of flight (e.g., cruise and loiter). In this regard, the main controller 202, 802 proceeds to command a hybrid powerplant (e.g., hybrid powerplant 100 of FIG. 2 or a plurality of hybrid powerplants 810 from FIG. 9) to supply a first power output to a primary thrust unit 241 and a second power output to a secondary thrust unit 243 (step 1404). The first power output for primary thrust unit 241 may be substantially similar to a power output supplied to the primary thrust unit 241 during other phases of flight (e.g., dash, cruise, landing, etc.), and the secondary thrust unit 243 may supply the additional power output to achieve a combined thrust output to meet a thrust demand for the takeoff event, in accordance with various embodiments. "Substantially similar" as referred to herein may refer to an average power output plus or minus 20%.

The process 1400 further comprises receiving, via the main controller 202, 802, a second power demand for a dash phase of flight (step 1406). The second power demand may be greater than or less than the first power demand during takeoff. In various embodiments, the second power demand is less than the first power demand. Similar to the takeoff event, the dash phase may be more thrust intensive relative to the cruise phase due to increased speed of the UAV 201, 801. In this regard, the main controller 202, 802 may proceed to command the hybrid powerplant (e.g., hybrid powerplant 100 of FIG. 2 or a plurality of hybrid powerplants 810 from FIG. 9), to supply the second power demand for the dash phase of flight to the primary thrust unit 241 (step 1408), and command the hybrid powerplant (e.g., hybrid powerplant 100 of FIG. 2 or a plurality of hybrid powerplants 810 from FIG. 9), to supply the second power demand for the dash phase of flight to the secondary thrust unit 243 (step 1409). In various embodiments, a power output provided to the primary thrust unit 241 may be substantially similar to the first power output from step 1404. In this regard, the primary thrust unit 241 may be configured to operate in an efficient state corresponding to a cruise state of flight, and the secondary thrust unit 243 may provide any additional power to meet the power demand for the dash phase of flight, in accordance with various embodiments.

The process 1400 further comprises receiving, via the main controller 202, 802, a third power demand for a cruise phase of flight (step 1410) and commanding, via the main controller 202, 802, the hybrid powerplant (e.g., hybrid powerplant 100 of FIG. 2 or a plurality of hybrid powerplants 810 from FIG. 9) to supply the third power demand to only the primary thrust unit (step 1412). In this regard, the secondary thrust unit 243 may be transitioned to an "OFF" state for a cruise phase of flight. In various embodiments, the primary thrust unit 241 may operate in a most efficient, or optimized, state during the cruise portion of flight. In various embodiments, the third power demand may be substantially similar to the first power output received by the primary thrust unit in step 1404 and/or the power output received by the primary thrust unit in step 1408.

The third power demand is less than the first power demand of step 1404 and the second power demand of step 1408.

The process 1400 may further comprise receiving, via the main controller 202, 802, a fourth power demand for a loiter phase of flight (step 1414). The fourth power demand may be slightly larger than the third power demand for cruise. In various embodiments, the process 1400 further comprises commanding, via the main controller 202, 802, the hybrid powerplant (e.g., hybrid powerplant 100 of FIG. 2 or a plurality of hybrid powerplants 810 from FIG. 9) to supply the fourth power demand to only the primary thrust unit (step 1414). In various embodiments, the fourth power demand could be split between the primary thrust unit and the secondary thrust unit. However, in various embodiments, it may be preferable for the UAV 201, 801 to operate via only the primary thrust unit 241, as the primary thrust unit 241 would still be in a highly efficient range of operation with the fourth power demand, in accordance with various embodiments.

The process 1400 further comprises receiving, via the main controller 202, 802, a fifth power demand for a landing phase of flight (step 1418) and commanding, via the main controller 202, 802, the hybrid powerplant (e.g., hybrid powerplant 100 of FIG. 2 or a plurality of hybrid powerplants 810 from FIG. 9) to supply a first power output to the primary thrust unit 241 and the second power output to a secondary thrust unit 243 (step 1420). The fifth power demand is greater than the third power demand during cruise in step 1412 and the fourth power demand during loiter in step 1416.

Figure 16:
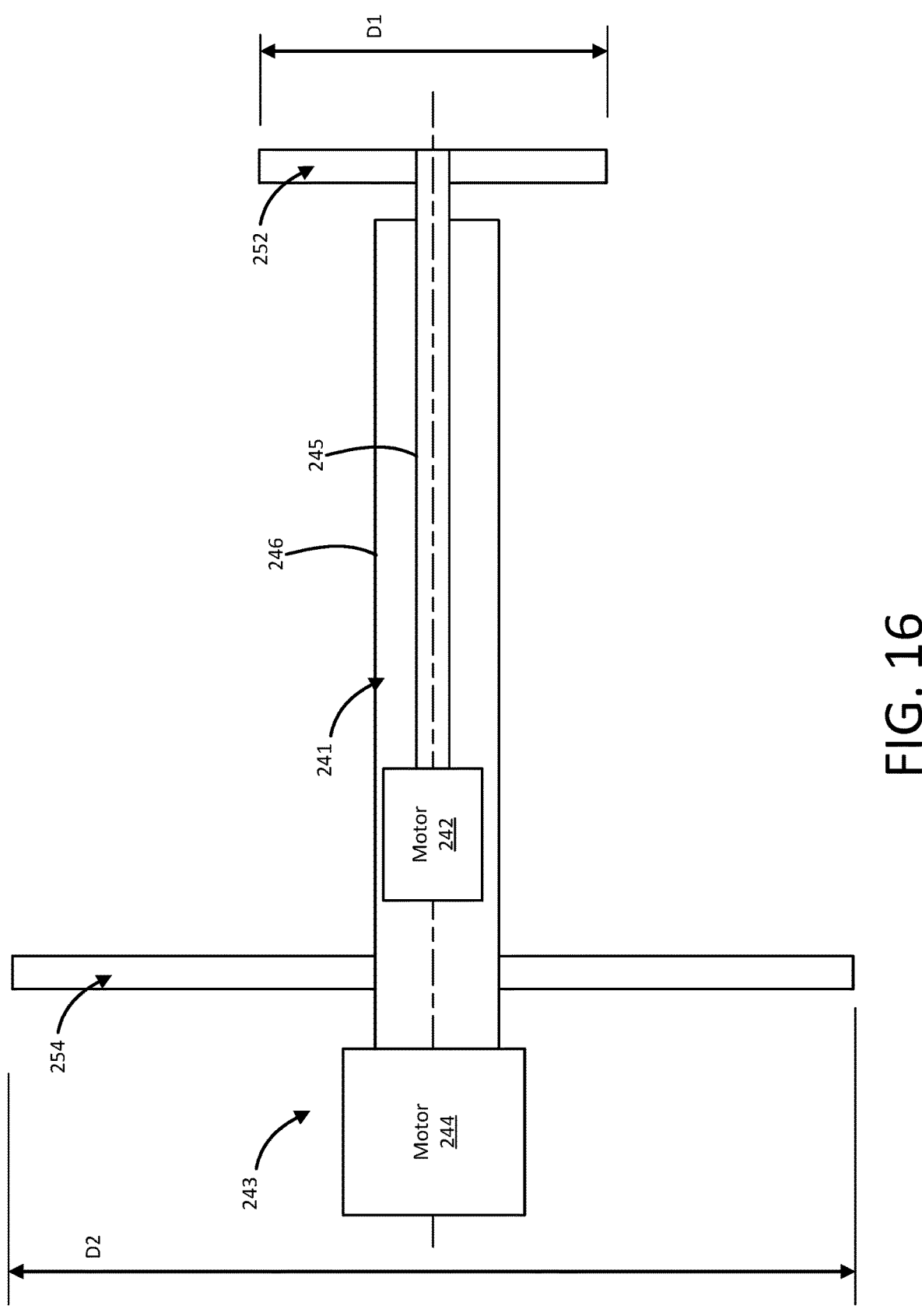
FIG. 16 illustrates a schematic view of a primary and secondary thrust unit, in accordance with various embodiments.

Referring now to FIG. 16, a schematic view of a primary thrust unit 241 and a secondary thrust unit 243 that are co-axial is illustrated in accordance with various embodiments. In various embodiments, the primary thrust unit 241 further comprises a shaft 245 operatively coupling the load motor 242 of the primary thrust unit 241 to the propellor 252 of the primary thrust unit. Similarly, the secondary thrust unit 243 may comprise a shaft 246 operatively coupling the second load motor 244 of the secondary thrust unit 243 to the propellor 254 of the secondary thrust unit 243. In various embodiments, the shaft 245 of the primary thrust unit 241 may be co-axial with the shaft 246 of the secondary thrust unit 243. Thus, at least a portion of the shaft 245 of the primary thrust unit 241 may be disposed within the shaft 246 of the secondary thrust unit 243. However, the present disclosure is not limited in this regard.

In various embodiments, the shaft 245 and the shaft 246 are configured to operate independently via respective load motors 242, 244 as described previously herein.

In various embodiments, the propellor 252 of the primary thrust unit 241 defines a first propellor diameter D1 and the propellor 254 of the second primary thrust unit 243 defines a second propellor diameter D2. In various embodiments, the second propellor diameter D2 is greater than the first propellor diameter D1. For example, the second propellor diameter D2 may be between 1.5 and 10 times larger than the first propellor diameter D1 or between 2 and 5 times larger than the first propellor diameter. The propellor diameter of the propellors 252, 254 may be a design consideration and vary based on various factors, such as aerodynamics, weight, and/or available envelope in the UAV system.

In various embodiments, the maximum thrust output of the secondary thrust unit is between 5 and 30 times the thrust or between 10 and 30 times the thrust. In this regard, as described previously herein, the secondary thrust unit may comprise a "high thrust" unit relative to the primary thrust unit which may comprise a "low thrust" unit. Thus, the primary thrust unit may be optimized for a cruise phase, whereas the secondary thrust unit may provide additional thrust in phases where the maximum thrust of the primary thrust unit does not meet the thrust demand.

Although described herein with respect to specific phases of flight (e.g., landing, dash, etc.), the present disclosure is not limited in this regard and are only meant as exemplary embodiments. One skilled in the art may appreciate that there are various phases of flight, various phases of ground or sea vehicle operation, or the like that remain within the scope of the present disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A hybrid powerplant, comprising:

a main power bus;

an engine;

a generator coupled to the engine, the generator in electrical communication with the main power bus;

an energy storage coupled to the main power bus in parallel to the engine;

an electrical switch disposed electrically between the main power bus and the energy storage; and a controller in electrical communication with the electrical switch, wherein the controller is configured to:

command the electrical switch to close in response to determining a power demand of an electrical load is greater than a maximum power output for the generator;

receive a power demand for an electrical load that is greater than a current power demand;

command the electrical switch to transition from an open position to a closed position to electrically couple the energy storage to the main power bus;

command the electrical switch to close in order to facilitate the energy storage to provide additional current capacity;

command the engine to accelerate to a second speed from a first speed and a second engine torque from a first engine torque correlated with the power demand; and command the electrical switch to transition from the closed position to the open position to disconnect the energy storage from the main power bus.

2. The hybrid powerplant of claim 1, wherein the hybrid powerplant has a main operating mode and an alternate operating mode, wherein in the main operating mode, the controller is configured to open the electrical switch and the engine remains in electrical communication with the main power bus, and wherein in an alternate operating mode, the controller is configured to close the electrical switch to electrically couple the energy storage to the main power bus.

3. The hybrid powerplant of claim 1, wherein the hybrid powerplant is configured to provide a variable voltage output to an electrical load through the main power bus.

4. The hybrid powerplant of claim 1, wherein the controller is further configured to determine when the engine is operating at the second speed and the second engine torque prior to commanding the electrical switch to transition from the closed position to the open position.

5. A generator management unit for a hybrid powerplant, the generator management unit comprising:

a processor; and a tangible, non-transitory computer-readable storage medium having instructions stored thereon that, in response to execution by the processor, cause the processor to perform operations comprising:

receiving, via the processor, a power demand for an electrical load that is greater than a current power demand being provided to the electrical load, the current power demand being provided by a generator operably coupled to an engine, the generator providing a first voltage, wherein the engine operates at a first speed and a first engine torque to produce the current power demand;

commanding, via the processor, an electrical switch to transition from an open position to a closed position to electrically couple an energy storage to a main power bus, the main power bus in electrical communication with the electrical load in parallel to the energy storage; and in response to the energy storage becoming electrically coupled to the main power bus, achieving the power demand, commanding, via the processor, the engine to accelerate to a second speed and a second engine torque correlated with the power demand; and commanding, via the processor, the electrical switch to transition from the closed position to the open position in response to the engine operating at the second speed and the second engine torque.

6. The generator management unit of claim 5, wherein the power demand exceeds a generator maximum power output of the generator.

7. The hybrid powerplant of claim 1, wherein a first output voltage of the generator is configured to vary below a second output voltage of the energy storage.

8. A generator management unit for a hybrid powerplant, the generator management unit comprising:

a processor; and a tangible, non-transitory computer-readable storage medium having instructions stored thereon that, in response to execution by the processor, cause the processor to perform operations comprising:

receiving, via the processor, a power demand for an electrical load that is greater than a current power demand being provided to the electrical load, the current power demand being provided by a generator operably coupled to an engine, the generator providing a first voltage;

commanding, via the processor, an electrical switch to transition from an open position to a closed position to electrically couple an energy storage to a main power bus, the main power bus in electrical communication with the electrical load in parallel to the energy storage;

in response to the energy storage becoming electrically coupled to the main power bus, achieving the power demand;

determining, via the processor, a second power demand for charging the energy storage;

commanding, via the processor, the engine to provide a second engine speed and a second engine torque correlated with a total power demand, the generator configured to power the electrical load and charge the energy storage in response to the engine providing the second engine speed and the second engine torque; and commanding the electrical switch to transition from the
closed position to the open position in response to
determining the energy storage is charged.

* * * * *